United States Patent
Park et al.

(10) Patent No.: US 9,900,068 B2
(45) Date of Patent: Feb. 20, 2018

(54) METHOD FOR REPORTING CHANNEL STATE INFORMATION FOR 3-DIMENSIONAL BEAM FORMING IN WIRELESS COMMUNICATIONS SYSTEM

(71) Applicant: LG ELECTRONICS INC., Seoul (KR)

(72) Inventors: Jonghyun Park, Seoul (KR); Byounghoon Kim, Seoul (KR); Hyukjin Chae, Seoul (KR); Youngtae Kim, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 154 days.

(21) Appl. No.: 14/759,397

(22) PCT Filed: Feb. 24, 2014

(86) PCT No.: PCT/KR2014/001462
§ 371 (c)(1),
(2) Date: Jul. 6, 2015

(87) PCT Pub. No.: WO2014/129858
PCT Pub. Date: Aug. 28, 2014

(65) Prior Publication Data
US 2015/0341092 A1    Nov. 26, 2015

Related U.S. Application Data

(60) Provisional application No. 61/768,527, filed on Feb. 24, 2013.

(51) Int. Cl.
*H04L 12/28* (2006.01)
*H04B 7/04* (2017.01)
(Continued)

(52) U.S. Cl.
CPC ......... *H04B 7/0469* (2013.01); *H04B 7/0478* (2013.01); *H04B 7/0617* (2013.01);
(Continued)

(58) Field of Classification Search
CPC .. H04B 7/0626; H04B 7/0469; H04B 7/0478; H04B 7/0639; H04B 7/0456;
(Continued)

(56) References Cited

U.S. PATENT DOCUMENTS

2011/0205930 A1    8/2011  Rahman et al.
2011/0222500 A1*   9/2011  Takaoka ................ H04L 5/0041
                                                    370/329
(Continued)

FOREIGN PATENT DOCUMENTS

KR    10-2010-0122521    11/2010
KR    10-2010-0136418    12/2010
(Continued)

OTHER PUBLICATIONS

Korean Intellectual Property Office Application Serial No. 10-2015-7018244, Notice of Allowance dated Jul. 19, 2016, 9 pages.
(Continued)

*Primary Examiner* — Noel Beharry
*Assistant Examiner* — Lionel Preval
(74) *Attorney, Agent, or Firm* — Lee Hong Degerman Kang & Waimey

(57) ABSTRACT

A method for reporting the channel state information for a 3-dimensional beam forming in a wireless communications system. A method for transmitting the channel state information (CSI) in a wireless communications system includes the steps of: receiving a reference signal from a base station supporting a 2-dimensional antenna array; determining the CSI based on the reference signal; and transmitting the determined CSI to the base station. The CSI includes the CSI (Continued)

set for each of T beam candidates defined in one dimension of the 2-dimensional antenna array. The CSI set includes at least one of the rank index (RI) in the one dimension, the pre-coding matrix (PMI) index in the one dimension, the RI in the two dimensions, the PMI in the two dimensions, and the channel quality index (CQI). Here, the RI in the two dimensions is variable for each of the T beam candidates.

13 Claims, 14 Drawing Sheets

(51) Int. Cl.
| | |
|---|---|
| *H04L 5/00* | (2006.01) |
| *H04B 7/06* | (2006.01) |
| *H04W 24/10* | (2009.01) |

(52) U.S. Cl.
CPC .......... *H04L 5/0057* (2013.01); *H04W 24/10* (2013.01); *H04B 7/0632* (2013.01); *H04B 7/0639* (2013.01)

(58) Field of Classification Search
CPC .. H04B 7/0486; H04B 7/0417; H04B 7/0617; H04B 7/0452; H04B 7/0408; H04B 7/0632; H04B 7/065; H04B 7/0663; H04L 5/0053; H04L 5/0057; H04W 24/08; H04W 24/10
See application file for complete search history.

(56) References Cited

U.S. PATENT DOCUMENTS

| | | | |
|---|---|---|---|
| 2011/0281536 A1 | 11/2011 | Lee et al. | |
| 2012/0257664 A1* | 10/2012 | Yue | H04B 7/0452 375/227 |
| 2012/0307649 A1 | 12/2012 | Park et al. | |
| 2013/0301432 A1* | 11/2013 | Hammarwall | H04W 24/02 370/252 |
| 2013/0308714 A1* | 11/2013 | Xu | H04B 7/0417 375/267 |
| 2013/0308715 A1* | 11/2013 | Nam | H04B 7/0469 375/267 |
| 2015/0078472 A1* | 3/2015 | Vook | H04B 7/0617 375/267 |

FOREIGN PATENT DOCUMENTS

| | | |
|---|---|---|
| KR | 10-2010-0138261 | 12/2010 |
| KR | 10-2010-0124331 | 5/2012 |
| KR | 10-2012-0093027 | 8/2012 |
| WO | 2011008519 | 1/2011 |
| WO | 2012/125190 | 3/2012 |

OTHER PUBLICATIONS

PCT International Application No. PCT/KR2014/001462, Written Opinion of the International Searching Authority dated May 28, 2014, 15 pages.
PCT International Application No. PCT/KR2014/001462, Written Opinion of the International Searching Authority dated May 28, 2014, 11 pages.
European Patent Office Application Serial No. 14753687.4, Search Report dated Sep. 8, 2016, 11 pages.
Alcatel-Lucent Shanghai Bell et al., "Considerations on CSI feedback enhancements for high-priority antenna configurations", R1-112420, 3GPP TSG-RAN WG1 #66, Aug. 26, 2011, 8 pages.
3rd Generation Partnership Project (3GPP), "Technical Specification Group Radio Access Network; Evolved Universal Terrestrial Radio Access (E-UTRA); Physical layer procedures (Release 11)," 3GPP TS 36.213 V11.1.0, Dec. 2012, 160 pages.

* cited by examiner (a) control-plane protocol stack (b) user-plane protocol stack ▨ : DMRS group 1

▩ : DMRS group 2

METHOD FOR REPORTING CHANNEL STATE INFORMATION FOR 3-DIMENSIONAL BEAM FORMING IN WIRELESS COMMUNICATIONS SYSTEM

CROSS-REFERENCE TO RELATED APPLICATIONS

This application is the National Stage filing under 35 U.S.C. 371 of International Application No. PCT/KR2014/001462, filed on Feb. 24, 2014, which claims the benefit of U.S. Provisional Application No. 61/768,527, filed on Feb. 24, 2013, the contents of which are all hereby incorporated by reference herein in their entirety.

TECHNICAL FIELD

The present invention relates to a wireless communication system and, more particularly, to a method for reporting channel state information (CSI) for 3-dimensional (3D) beamforming in a wireless communication system, and an apparatus therefor.

BACKGROUND ART

A brief description is now given of a $3^{rd}$ Generation Partnership Project Long Term Evolution (3GPP LTE or, simply, LTE) communication system as an example of a wireless communication system to which the present invention is applicable.

FIG. 1 illustrates a schematic structure a network structure of an evolved universal mobile telecommunication system (E-UMTS). An E-UMTS system is an evolved version of the UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist for one BS. The cell provides a downlink or uplink transmission service to several UEs using any one of bandwidths of 1.4, 3, 5, 10, 15 and 20 MHz. Different cells may be set to provide different bandwidths. A BS controls data transmission or reception to or from a plurality of UEs. The BS transmits downlink scheduling information to a UE with respect to downlink (DL) data so as to inform the UE of time/frequency domain, coding, data size, Hybrid Automatic Repeat and reQuest (HARQ) associated information of data to be transmitted, or the like. The BS transmits uplink scheduling information to a UE with respect to uplink (UL) data so as to inform the UE of time/frequency domain, coding, data size, HARQ associated information used by the UE, or the like. An interface for transmitting user traffic or control traffic can be used between BSs. A Core Network (CN) may include the AG, a network node for user registration of the UE, or the like. The AG manages mobility of a UE on a Tracking Area (TA) basis. One TA includes a plurality of cells.

Wireless communication technology has been developed to reach the LTE based on Wideband Code Division Multiple Access (WCDMA), but demands and expectations of users and providers have continuously increased. In addition, since other aspects of wireless access technology continue to evolve, new advances are required to remain competitive in the future. There is a need for reduction in cost per bit, service availability increase, the use of a flexible frequency band, a simple structure and an open type interface, appropriate power consumption of a UE, etc.

Multiple-Input Multiple-Output (MIMO) technology is a technology capable of improving data transmission/reception efficiency using multiple transmit (Tx) antennas and multiple receive (Rx) antennas instead of using a single Tx antenna and a single Rx antenna. A receiver using a single antenna receives data through a single antenna path, but a receiver using multiple antennas receives data through multiple paths. Accordingly, data transfer rate and data throughput may be improved, and coverage may be expanded.

To increase a multiplexing gain of MIMO operation, a MIMO transmitter may receive and use channel state information (CSI) fed back from a MIMO receiver.

DISCLOSURE

Technical Problem

An object of the present invention devised to solve the problem lies in a method for reporting channel state information (CSI) for 3-dimensional (3D) beamforming in a wireless communication system, and an apparatus therefor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

The object of the present invention can be achieved by providing a method for transmitting channel state information (CSI) by a user equipment (UE) in a wireless communication system, the method including receiving a reference signal from a base station supporting a 2-dimensional (2D) antenna array, determining the CSI using the reference signal, and transmitting the determined CSI to the base station. The CSI may include a CSI set for each of T (T≥1) beam candidates defined in a first dimension of the 2D antenna array. The CSI set may include one or more of a rank indicator (RI) in the first dimension, a precoding matrix index (PMI) in the first dimension, a RI in a second dimension, a PMI in the second dimension, and a channel quality indicator (CQI). Here, the RI in the second dimension may be variable in each of the T beam candidates.

In another aspect of the present invention, provided herein is a user equipment (UE) for transmitting channel state information (CSI) in a wireless communication system, the UE including a transmission module, a reception module, and a processor. The processor may be configured to receive a reference signal from a base station supporting a 2-dimensional (2D) antenna array, using the reception module, to determine the CSI using the reference signal, and to transmit the determined CSI to the base station using the transmission module. The CSI may include a CSI set for each of T (T≥1) beam candidates defined in a first dimension of the 2D antenna array. The CSI set may include one or more of a rank indicator (RI) in the first dimension, a precoding matrix index (PMI) in the first dimension, a RI in a second dimension, a PMI in the second dimension, and a channel quality indicator (CQI). Here, the RI in the second dimension may be variable in each of the T beam candidates.

The following is commonly applicable to the above aspects of the present invention.

The CQI may be calculated individually for an i-th (i=0, 1, . . . , T−1) beam candidate among the T beam candidates.

The CQI may be calculated as an integrated CQI for the T beam candidates.

When a rank value in the first dimension is restricted to 1, the RI in the first dimension in the CSI set may be omitted.

The RI in the second dimension and the PMI in the second dimension may be determined based on the RI in the first dimension and the PMI in the first dimension.

The CSI set may include information about the value T selected by the UE.

Information about candidates of the value T may be configured by the base station.

In case of periodic CSI report, the CSI set for one beam candidate among the T beam candidates may be reported and then the CSI set for one subsequent beam candidate may be reported. Alternatively, specific-type CSI for all of the T beam candidates may be reported and then another-type CSI for all of the T beam candidates may be reported.

One CSI-process may be configured for each of the T beam candidates. The CSI-process may be configured using a CSI-reference signal (RS) resource configured for each of the T beam candidates, and a CSI-interference measurement (IM) resource commonly configured for the T beam candidates.

A minimum value of the RI in the first dimension or the RI in the second dimension may be 0.

When a value of specific-type CSI for an i-th (i=0, 1, . . . , T−1) beam candidate among the T beam candidates equals a value of the specific-type CSI for an (i+1)-th beam candidate, the value of the specific-type CSI for the i-th beam candidate may be validly reported and the value of the specific-type CSI for the (i+1)-th beam candidate may be dropped or configured with a null value.

T pieces of equal-type CSI for the T beam candidates may be joint-encoded.

One or more of the RI in the first dimension and the RI in the second dimension for a specific beam candidate among the T beam candidates may be configured to be equal to or greater than 1.

The first dimension may correspond to a horizontal direction of the 2D antenna array and the second dimension may correspond to a vertical direction of the 2D antenna array. Alternatively, the first dimension may correspond to a vertical direction of the 2D antenna array and the second dimension may correspond to a horizontal direction of the 2D antenna array.

It is to be understood that both the foregoing general description and the following detailed description of the present invention are exemplary and explanatory and are intended to provide further explanation of the invention as claimed.

Advantageous Effects

According to an embodiment of the present invention, channel state information (CSI) for 3-dimensional (3D) beamforming may be accurately and efficiently reported in a wireless communication system.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention.

BEST MODE

Reference will now be made in detail to the preferred embodiments of the present invention, examples of which are illustrated in the accompanying drawings. The following embodiments are examples in which the technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In this specification, the term base station may be comprehensively used to include remote radio head (RRH), evolved node B (eNB), transmission point (TP), reception point (RP), relay, etc.

Figure 1:
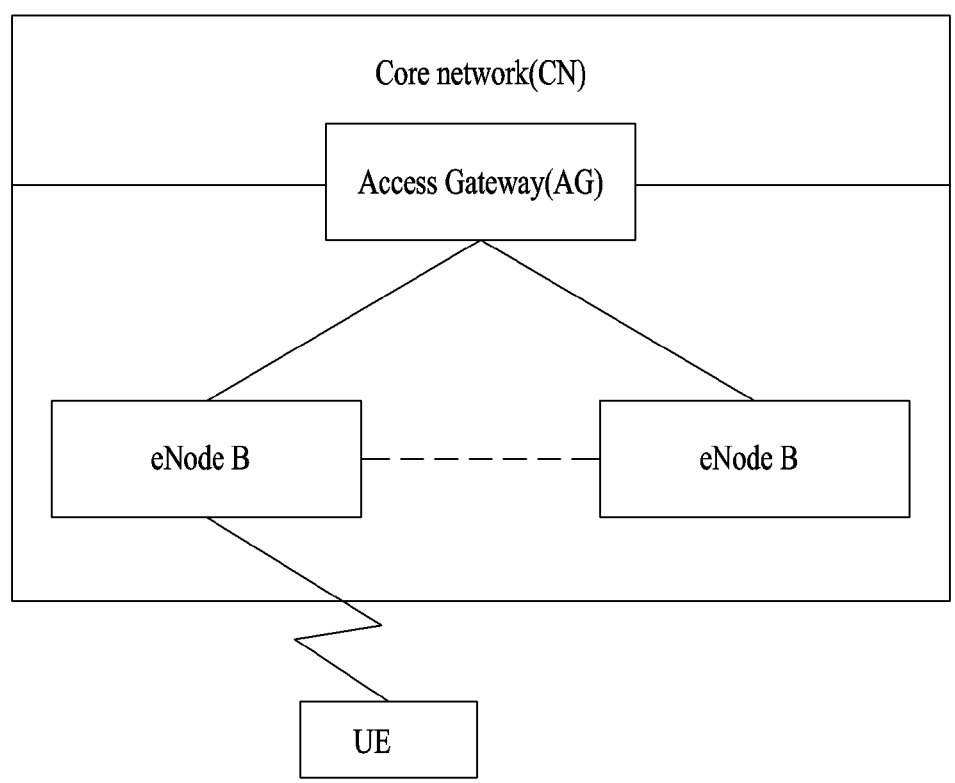
FIG. 1 is a schematic diagram showing a network architecture of an Evolved Universal Mobile Telecommunications System (E-UMTS) as an example of a mobile communication system.
Figure 2:
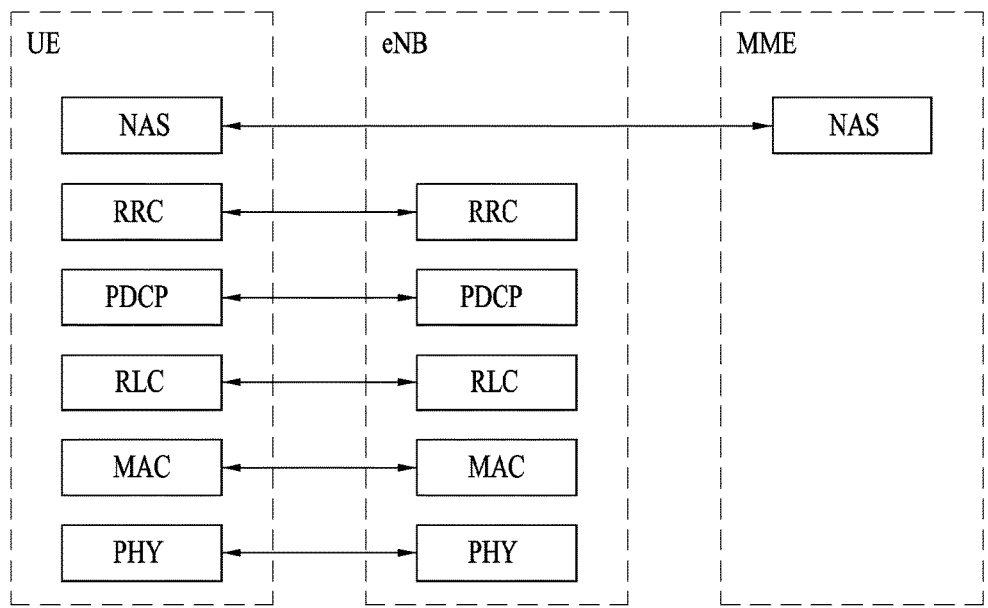
FIG. 2 is a diagram showing the structure of a control plane and a user plane of a radio interface protocol between a User Equipment (UE) and an E-UTRAN based on the 3GPP radio access network standard.
Figure 2:
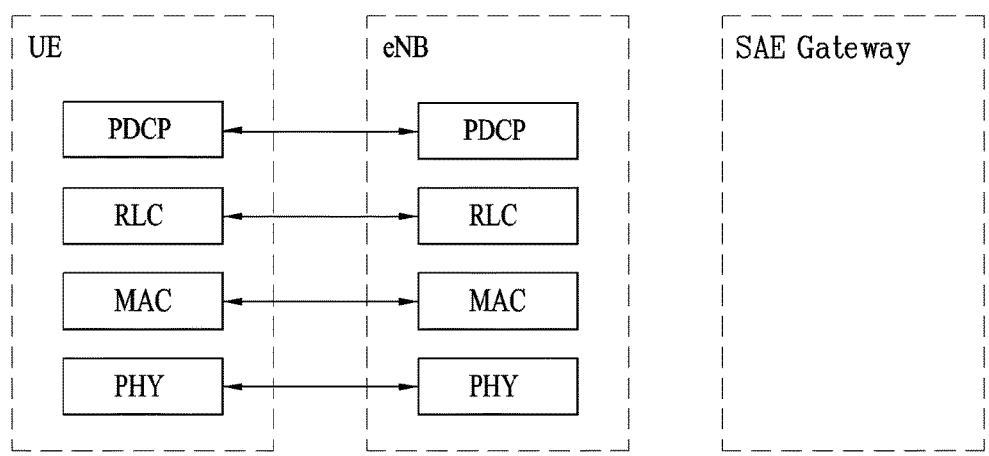

FIG. 2 is a diagram showing the structure of a control plane and a user plane of a radio interface protocol between a UE and an E-UTRAN based on the 3GPP radio access network standard. The control plane refers to a path through which control messages used for managing a call by the UE and the E-UTRAN are transmitted. The user plane refers to a path through which data generated at an application layer, for example, voice data, Internet packet data or the like is transmitted.

The physical layer, which is the first layer, provides an information transfer service to a higher layer using a physical channel. The physical layer is connected with a medium access control (MAC) layer located at a higher level through a transport channel, and data is transferred between the MAC layer and the physical layer via the transport channel. Data is transferred between physical layers of a transmission side and a reception side via the physical channel. The physical channel uses time and frequency as radio resources. In detail, the physical channel is modulated using an Orthogonal Frequency Division Multiple Access (OFDMA) scheme in downlink and is modulated using a Single Carrier Frequency Division Multiple Access (SC-FDMA) scheme in uplink.

The MAC layer of the second layer provides services to a radio link control (RLC) layer, which is a higher layer, via a logical channel. The RLC layer of the second layer enables reliable data transmission. The function of the RLC layer is included as the functional block of the MAC layer. A Packet Data Convergence Protocol (PDCP) layer of the second layer performs a header compression function that reduces the size of an Internet protocol (IP) packet header containing unnecessary control information having a relatively large size in order to efficiently transmit the IP packets such as IPv4 or IPv6 packets over a radio interface having a limited bandwidth.

A Radio Resource Control (RRC) located at a lowest portion of the third layer is defined only in the control plane. The RRC layer handles logical channels, transport channels and physical channels for the configuration, re-configuration and release of Radio Bearers (RBs). Here, the RBs refer to services provided by the second layer, for data transfer between the UE and the network. The RRC layers of the UE and the network exchange RRC messages with each other. If the RRC layers of the UE and the network are RRC-connected, the UE is in an RRC connected mode and, if so not, is in an RRC idle mode. A Non-Access Stratum (NAS) layer located at a layer higher than the RRC layer performs a function such as session management and mobility management.

One cell configuring a base station (eNB) provides a downlink or uplink transmission service to several UEs using any one of bandwidths of 1.4, 3, 5, 10, 15 and 20 MHz. Different cells may be set to provide different bandwidths.

Examples of a downlink transport channel for transmitting data from the network to the UE include a Broadcast Channel (BCH) for transmitting system information, a Paging Channel (PCH) for transmitting a paging message, or a downlink Shared Channel (SCH) for transmitting user traffic or a control message. Traffic or a control message of a broadcast service or downlink multicast may be transmitted through the downlink SCH or a separate downlink Multicast Channel (MCH). Examples of an uplink transport channel for transmitting data from the UE to the network include a Random Access Channel (RACH) for transmitting an initial control message and an uplink SCH for transmitting user traffic or a control message. Examples of a logical channel located at a layer above the transport channel and mapped to the transport channel includes a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
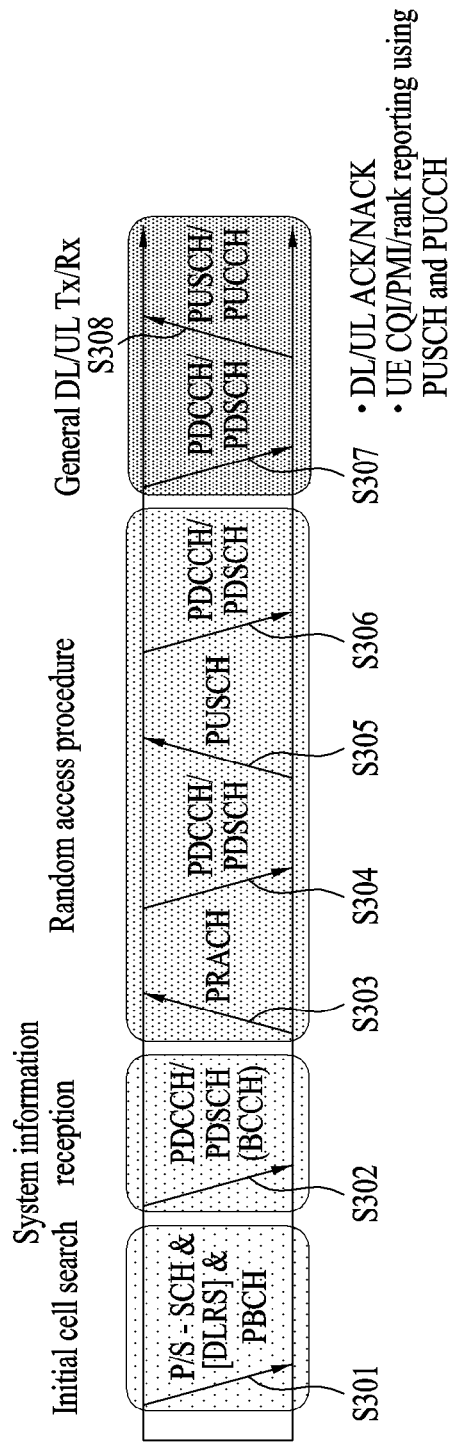
FIG. 3 is a diagram illustrating physical channels used in a 3GPP system and a general signal transmitting method using the same.

FIG. 3 is a diagram illustrating physical channels used in a 3GPP system and a general signal transmitting method using the same.

If a UE is powered on or newly enters a cell, the UE performs an initial cell search operation such as synchronization with a base station (S301). The UE receives a primary synchronization channel (P-SCH) and a secondary synchronization channel (S-SCH) from the base station so as to synchronize with the base station and to acquire information such as a cell ID. Thereafter, the UE may receive a physical broadcast channel from the base station so as to acquire a broadcast signal in the cell. The UE may receive a downlink reference signal (DL RS) so as to check a downlink channel state in the initial cell search step.

The UE, upon completion of initial cell search, may receive a Physical Downlink Control Channel (PDCCH) and a Physical Downlink Shared Channel (PDSCH) according to information carried in the PDCCH so as to acquire more detailed system information (S302).

When the UE initially accesses the base station or when radio resources for signal transmission are not present, the UE may perform a Random Access Procedure (RACH) with respect to the base station (steps S303 to S306). The UE may transmit a specific sequence using a preamble through a Physical Random Access Channel (PRACH) (S303 and S305) and receive a response message of the preamble through the PDCCH and the PDSCH corresponding thereto (S304 and S306). In the contention-based RACH, a contention resolution procedure may be additionally performed.

The UE which performs the above-described procedure may receive the PDCCH/PDSCH (S307) and transmit a Physical Uplink Shared Channel (PUSCH)/Physical Uplink Control Channel (PUCCH) (S308), as a general uplink/downlink signal transmission procedure. Specifically, the UE receives downlink control information (DCI) through the PDCCH. Here, the DCI includes control information such as resource allocation information for the UE, and has a different format depending on the use thereof.

Meanwhile, the information transmitted from the UE to the base station in uplink and transmitted from the base station to the UE may include a downlink/uplink ACK/NACK signal, a Channel Quality Indicator (CQI), a Precoding Matrix Index (PMI), a Rank Indicator (RI), etc. In the 3GPP LTE system, the UE may transmit the above-described information such as CQI/PMI/RI through the PUSCH and/or the PUCCH.

Figure 4:
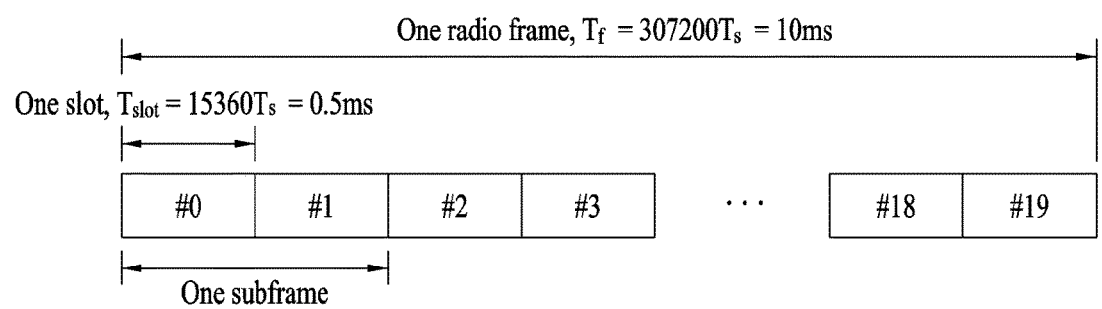
FIG. 4 illustrates exemplary radio frame structures in a LTE system.

FIG. 4 illustrates exemplary radio frame structures in a LTE system.

Referring to FIG. 4, a radio frame is 10 ms (307200 $T_s$) and divided into 10 equal-sized subframes. The 10 subframes of a radio frame may be indexed. Herein, $T_s$ represents a sampling time and $T_s=1/(2048*15\ \text{kHz})$ (approximately, 33 ns). Each subframe is 1 ms long, including two slots. Each slot is 0.5 ms (15360 $T_s$) long. A slot includes a plurality of orthogonal frequency division multiplexing (OFDM) symbols in the time domain and a plurality of resource blocks (RBs) in the frequency time. In a LTE system, single resource block includes 12 (subcarriers)*7 (or 6) OFDM symbols. TTI (Transmission Time Interval), which is unit time for data transfer, can be defined by one or more subframes. The aforementioned structure of the radio frame is shown for exemplary purposes only. Thus, the number of subframes included in the radio frame or the number of slots included in the subframe or the number of OFDM symbols included in the slot may be modified in various manners.

Figure 5:
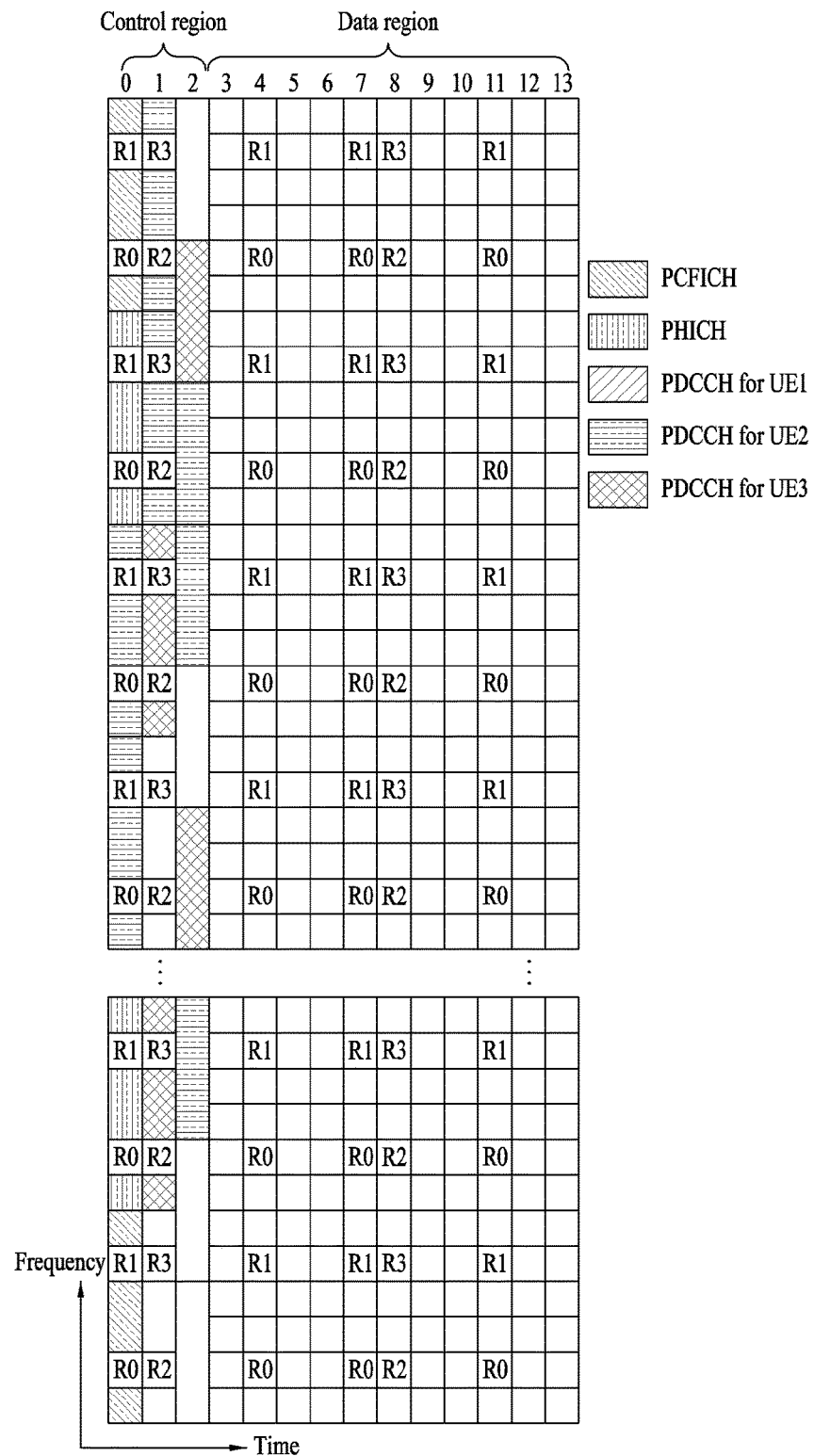
FIG. 5 illustrates a structure of a DL (DownLink) subframe in a LTE system.

FIG. 5 illustrates control channels included in a control region of one subframe in a downlink radio frame.

Referring to FIG. 5, the subframe consists of 14 OFDM symbols. Initial 1 to 3 OFDM symbols are used as the control region and the other 13 to 11 OFDM symbols are used as a data region depending on a subframe configuration. In this figure, R1 to R4 denote reference signals (RSs) (or pilot signals) for antennas 0 to 3. The RSs are fixed as a certain pattern in the subframe irrespective of the control region and the data region. The control channels are allocated to resources of the control region to which no RS is allocated, and traffic channels are allocated to resources of the data region to which no RS is allocated. The control channels allocated to the control region include a Physical Control Format Indicator Channel (PCFICH), a Physical HARQ (Hybrid-Automatic Repeat and Request) Indicator Channel (PHICH), a Physical Downlink Control Channel (PDCCH), etc.

The PCFICH signals the number of OFDM symbols used for the PDCCH in every subframe to the UE. The PCFICH is located in the first OFDM symbol and is configured prior to the PHICH and the PDCCH. The PCFICH consists of 4 resource element groups (REGs) each distributed over the control region based on cell identity (ID). One REG consists of 4 resource elements (REs). The RE refers to a minimum physical resource defined as one subcarrier×one OFDM symbol. The value of the PCFICH indicates one of values 1 to 3 or 2 to 4 depending on a bandwidth and is modulated through quadrature phase shift keying (QPSK).

The PHICH is used to carry HARQ ACK/NACK for uplink transmission. That is, the PHICH refers to a channel for transmitting DL ACK/NACK information for UL HARQ. The PHICH consists of 1 REG, and is scrambled cell-specifically. ACK/NACK is indicated using 1 bit, and is modulated through binary phase shift keying (BPSK). The modulated ACK/NACK is spread using a spreading factor (SF)=2 or 4. A plurality of PHICH channels mapped to the same resource form a PHICH group. The number of PHICH channels multiplexed into the PHICH group is determined depending on the number of spreading codes. The PHICH (group) is repeated 3 times to achieve diversity gain in the frequency domain and/or the time domain.

The PDCCH is allocated to initial n OFDM symbols of the subframe. Here, n is an integer equal to or greater than 1 and is indicated by the PCFICH. The PDCCH consists of one or more CCEs. The PDCCH signals information related to resource allocation of a Paging Channel (PCH) and a Downlink-Shared Channel (DL-SCH) which are transmission channels, uplink scheduling grant, HARQ information, etc. to each UE or UE group. The PCH and the DL-SCH are transmitted through a PDSCH. Accordingly, the base station and the UE generally transmit and receive data other than specific control information or specific service data through the PDSCH.

Information about a UE (or UEs) targeted by the data of the PDSCH, information about schemes for receiving and decoding the PDSCH data by the UEs, etc. are carried by the PDCCH. For example, it is assumed that a specific PDCCH is CRC-masked with radio network temporary identity (RNTI) "A" and information about data to be transmitted using radio resource (e.g., frequency location) "B" and DCI format (i.e., transmission format information (e.g., transmission block size, modulation scheme, coding information, etc.)) "C" is transmitted in a specific subframe. In this case, a UE within a cell monitors, i.e., blind-decodes, the PDCCH in a search area using RNTI information of the UE. If one or more UEs have RNTI "A", the UEs receive the PDCCH, and receive a PDSCH indicated by "B" and "C" using information of the received PDCCH.

Figure 6:
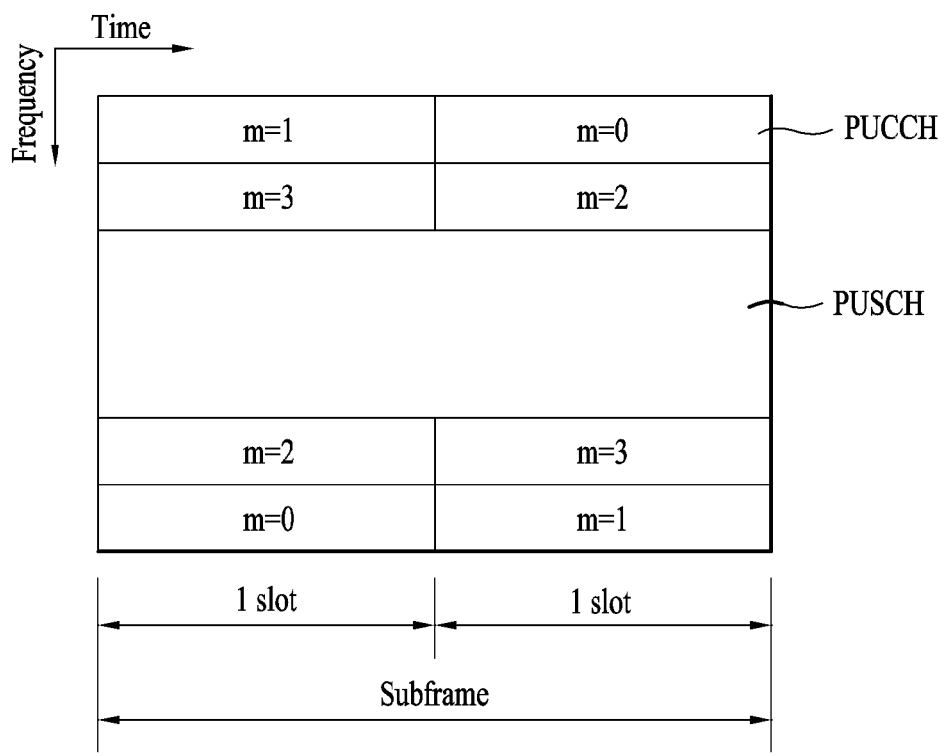
FIG. 6 illustrates the structure of a UL (UpLink) subframe in a LTE system.

FIG. 6 illustrates the structure of a UL subframe in a LTE system.

Referring to FIG. 6, the UL subframe can be divided into a region to which Physical Uplink Control Channels (PUCCHs) carrying control information are allocated, and a region to which Physical Uplink Shared Channels (PUSCHs) carrying user data are allocated. A middle part of the subframe is allocated for the PUSCHs, and two side parts of the data region in the frequency domain are allocated for the PUCCHs. The control information carried by the PUCCH includes ACK/NACK used for HARQ, a channel quality indicator (CQI) indicating DL channel state, a rank indicator (RI) for MIMO, a scheduling request (SR) which is a UL resource allocation request, etc. The PUCCH for one UE uses one resource block which occupies different frequencies in slots of the subframe. That is, 2 resource blocks allocated for the PUCCH are frequency hopped at a slot boundary. Specifically, FIG. 6 exemplarily shows that a PUCCH of m=0, a PUCCH of m=1, a PUCCH of m=2, and a PUCCH of m=3 are allocated to the subframe.

A description is now given of a MIMO system. Multiple-Input Multiple-Output (MIMO) is a method using multiple Tx antennas and multiple Rx antennas, and this method may improve transmission and reception efficiency of data. That is, a transmitter or receiver of a wireless communication system uses multiple antennas and thus the capacity and performance thereof may be improved. In the following description of the present invention, MIMO can be called 'multiple antenna technology'.

In the multiple antenna technology, reception of one whole message does not depend on a single antenna path. Instead, in the multiple antenna technology, data fragments received through multiple antennas are collected and combined to complete data. If the multiple antenna technology is used, a data transfer rate within a cell region of a specific size may be improved, or system coverage may be improved while ensuring a specific data transfer rate. In addition, this technology can be broadly used by mobile communication devices and relays. Due to the multiple antenna technology, restriction on mobile communication traffic based on a legacy technology using a single antenna can be solved.

Figure 7:
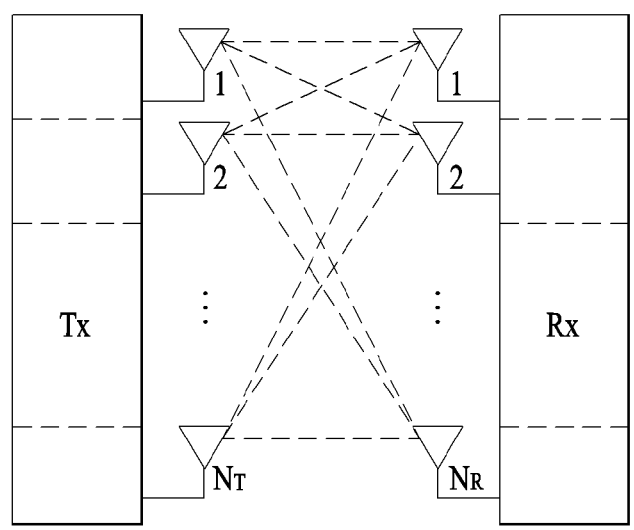
FIG. 7 is a structural diagram of a general Multiple-Input Multiple-Output (MIMO) communication system.

FIG. 7 shows the configuration of a wireless communication system including multiple antennas. When both the number of transmit (Tx) antennas and the number of Rx antennas respectively to $N_T$ and $N_R$, a theoretical channel transmission capacity of the MIMO communication system increases in proportion to the number of antennas, differently from the above-mentioned case in which only a transmitter or receiver uses several antennas, so that transmission rate and frequency efficiency can be greatly increased. In this case, the transfer rate acquired by the increasing channel transmission capacity can theoretically increase by a predetermined amount that corresponds to multiplication of a maximum transfer rate ($R_o$) acquired when one antenna is used and a rate of increase ($R_i$). The rate of increase ($R_i$) can be represented by the following equation 1.

$$R_i = \min(N_T, N_R) \quad \text{[Equation 1]}$$

For example, provided that a MIMO system uses four Tx antennas and four Rx antennas, the MIMO system can theoretically acquire a high transfer rate which is four times higher than that of a single antenna system. After the above-mentioned theoretical capacity increase of the MIMO system was demonstrated in the mid-1990s, many developers began to conduct intensive research into a variety of technologies which can substantially increase data transfer rate using the theoretical capacity increase. Some of the above technologies have been reflected in a variety of wireless communication standards, for example, third-generation mobile communication or next-generation wireless LAN, etc.

A variety of MIMO-associated technologies have been intensively researched by many companies or developers, for example, research into information theory associated with MIMO communication capacity under various channel environments or multiple access environments, research into a radio frequency (RF) channel measurement and modeling of the MIMO system, and research into a space-time signal processing technology.

Mathematical modeling of a communication method for use in the above-mentioned MIMO system will hereinafter be described in detail. As can be seen from FIG. 7, it is assumed that there are $N_T$ Tx antennas and $N_R$ Rx antennas. In the case of a transmission signal, a maximum number of transmission information pieces is $N_T$ under the condition that $N_T$ Tx antennas are used, so that the transmission information can be represented by a specific vector shown in the following equation 2.

$$s = [s_1, s_2, \ldots, s_{N_T}]^T \quad \text{[Equation 2]}$$

In the meantime, individual transmission information pieces $s_1, s_2, \ldots, s_{N_T}$ may have different transmission powers. In this case, if the individual transmission powers are denoted by $P_1, P_2, \ldots, P_{N_T}$, transmission information having an adjusted transmission power can be represented by a specific vector shown in the following equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In Equation 3, $\hat{s}$ is a transmission vector, and can be represented by the following equation 4 using a diagonal matrix P of a transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

In the meantime, the information vector $\hat{s}$ having an adjusted transmission power is applied to a weight matrix W, so that $N_T$ transmission signals $x_1, x_2, \ldots, x_{N_T}$ to be actually transmitted are configured. In this case, the weight matrix W is adapted to properly distribute transmission information to individual antennas according to transmission channel situations. The above-mentioned transmission signals $x_1, x_2, \ldots, x_{N_T}$ can be represented by the following equation 5 using the vector X. Here, $W_{ij}$ denotes a weight corresponding to i-th Tx antenna and j-th information. W represents a weight matrix or precoding matrix.

$$x = \begin{bmatrix} x_1 \\ x_2 \\ \vdots \\ x_i \\ \vdots \\ x_{N_T} \end{bmatrix} \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

Generally, a matrix rank is defined by a smaller number between the number of rows and the number of columns, in which the rows and the columns are independent of each other. Therefore, the matrix rank cannot be higher than the number of rows or columns. The rank of the channel matrix H can be represented by the following equation 6.

$$\mathrm{rank}(H) \leq \min(N_T, N_R) \quad \text{[Equation 6]}$$

In addition, each of different pieces of information transmitted using the multiple antenna technology is now defined as a 'transport stream' or simply a 'stream'. This 'stream' can be called a 'layer'. Then, the number of transport streams cannot be greater than a channel rank which is the maximum number of different pieces of information transmittable using the multiple antenna technology. Accordingly, a channel matrix H can be expressed as given by Equation 7.

$$\text{\# of streams} \leq \mathrm{rank}(H) \leq \min(N_T, N_R) \quad \text{[Equation 7]}$$

Here, "# of streams" denotes the number of streams. Meanwhile, it should be noted here that one stream can be transmitted through one or more antennas.

There can be a variety of methods for mapping one or more streams to multiple antennas. These methods may be described as follows depending on the type of the multiple antenna technology. A case in which a single stream is transmitted through multiple antennas can be regarded as a spatial diversity scheme, and a case in which multiple streams are transmitted through multiple antennas can be regarded as a spatial multiplexing scheme. Alternatively, a hybrid of spatial diversity and spatial multiplexing can also be used.

A detailed description is now given of reference signals (RSs).

In general, a reference signal known to both a transmitter and a receiver is transmitted from the transmitter to the receiver for channel measurement together with data. This reference signal indicates a modulation scheme as well as a channel measurement scheme to perform a demodulation procedure. The reference signal is divided into a dedicated RS (DRS), i.e., a UE-specific RS, for a base station and a specific UE, and a common RS (CRS), i.e., a cell-specific RS, for all UEs in a cell. In addition, the cell-specific RS includes a reference signal for reporting CQI/PMI/RI measured by the UE to the base station, which is called a channel state information-RS (CSI-RS).

Figure 8:
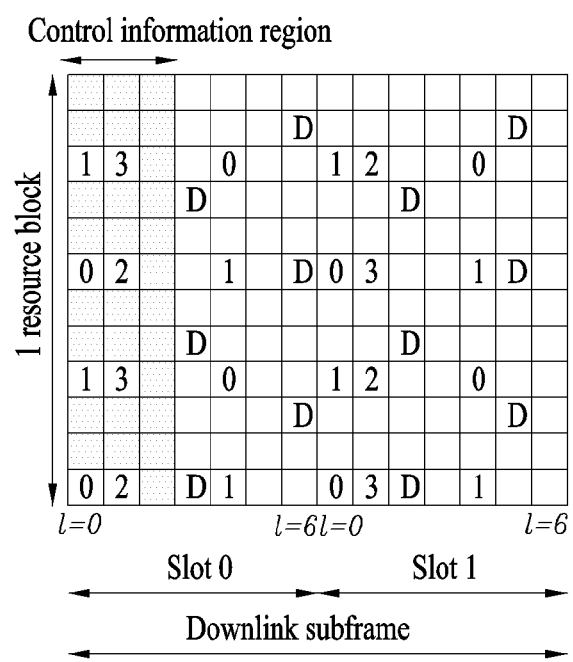
FIGS. 8 and 9 are diagrams showing the structures of downlink reference signals in a LTE system supporting downlink transmission using 4 antennas.
Figure 9:
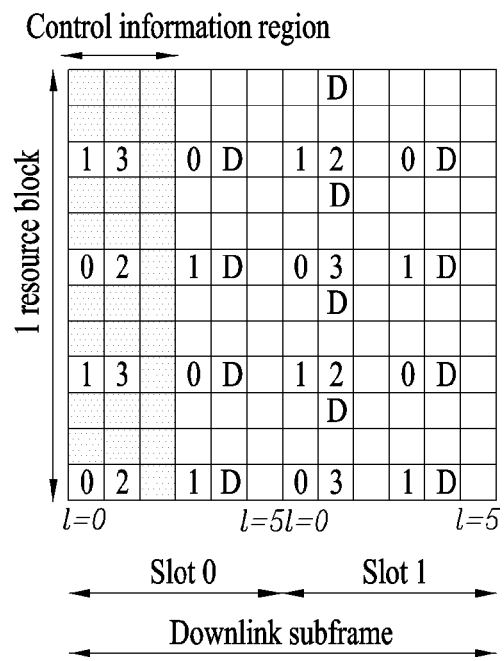

FIGS. 8 and 9 are diagrams showing the structures of reference signals in a LTE system supporting downlink transmission using 4 antennas. Specifically, FIG. 8 illustrates the case of a normal cyclic prefix (CP), and FIG. 9 illustrates the case of an extended CP.

Referring to FIGS. 8 and 9, 0 to 3 marked in the grid denote common RSs (CRSs) which are cell-specific RSs transmitted through antenna ports 0 to 3 for channel measurement and data demodulation, and the CRSs which are the cell-specific RSs can be transmitted to UEs over a control information region as well as a data information region.

In addition, 'D' marked in the grid denotes a downlink demodulation-reference signal (DM-RS) which is a UE-specific RS, and the DM-RS supports single antenna port transmission through a data region, i.e., PDSCH. The UE receives a higher layer signal indicating whether a DM-RS, which is a UE-specific RS, is present. FIGS. 8 and 9 exemplarily illustrate a DM-RS corresponding to antenna port 5, and 3GPP 36.211 also defines DM-RSs corresponding to antenna ports 7 to 14, i.e., a total of 8 antenna ports.

Figure 10:
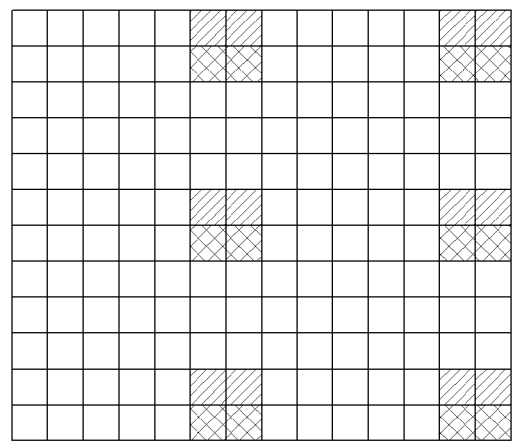
FIG. 10 exemplarily illustrates downlink demodulation-reference signal (DM-RS) allocation currently defined by the 3GPP specification.

FIG. 10 exemplarily illustrates downlink DM-RS allocation currently defined by the 3GPP specification.

Referring to FIG. 10, DM-RSs corresponding to antenna ports {7, 8, 11, 13} are mapped to DM-RS group 1 using antenna port sequences, and DM-RSs corresponding to antenna ports {9, 10, 12, 14} are mapped to DM-RS group 2 using antenna port sequences.

Meanwhile, unlike CRS, CSI-RS has been proposed above for PDSCH channel measurement, and can be defined as up to 32 different CSI-RS configurations to reduce inter-cell interference (ICI) in a multiple-cell environment.

The CSI-RS configuration differs depending on the number of antenna ports, and neighboring cells are configured to transmit CSI-RSs defined as different CSI-RS configurations as possible. Unlike CRS, CSI-RS supports up to 8 antenna ports, and a total of 8 antenna ports from antenna port 15 to antenna port 22 are allocated as antenna ports for CSI-RS in the 3GPP specification. Tables 1 and 2 show CSI-RS configurations defined in the 3GPP specification. Specifically, Table 1 shows the case of a normal CP, and Table 2 shows the case of an extended CP.

TABLE 1

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 2

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |

TABLE 2-continued

| | | Number of CSI reference signals configured | | | | | |
|---|---|---|---|---|---|---|---|
| | CSI reference signal | 1 or 2 | | 4 | | 8 | |
| | configuration | (k', l') | $n_s$ mod 2 | (k', l') | $n_s$ mod 2 | (k', l') | $n_s$ mod 2 |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Figure 11:
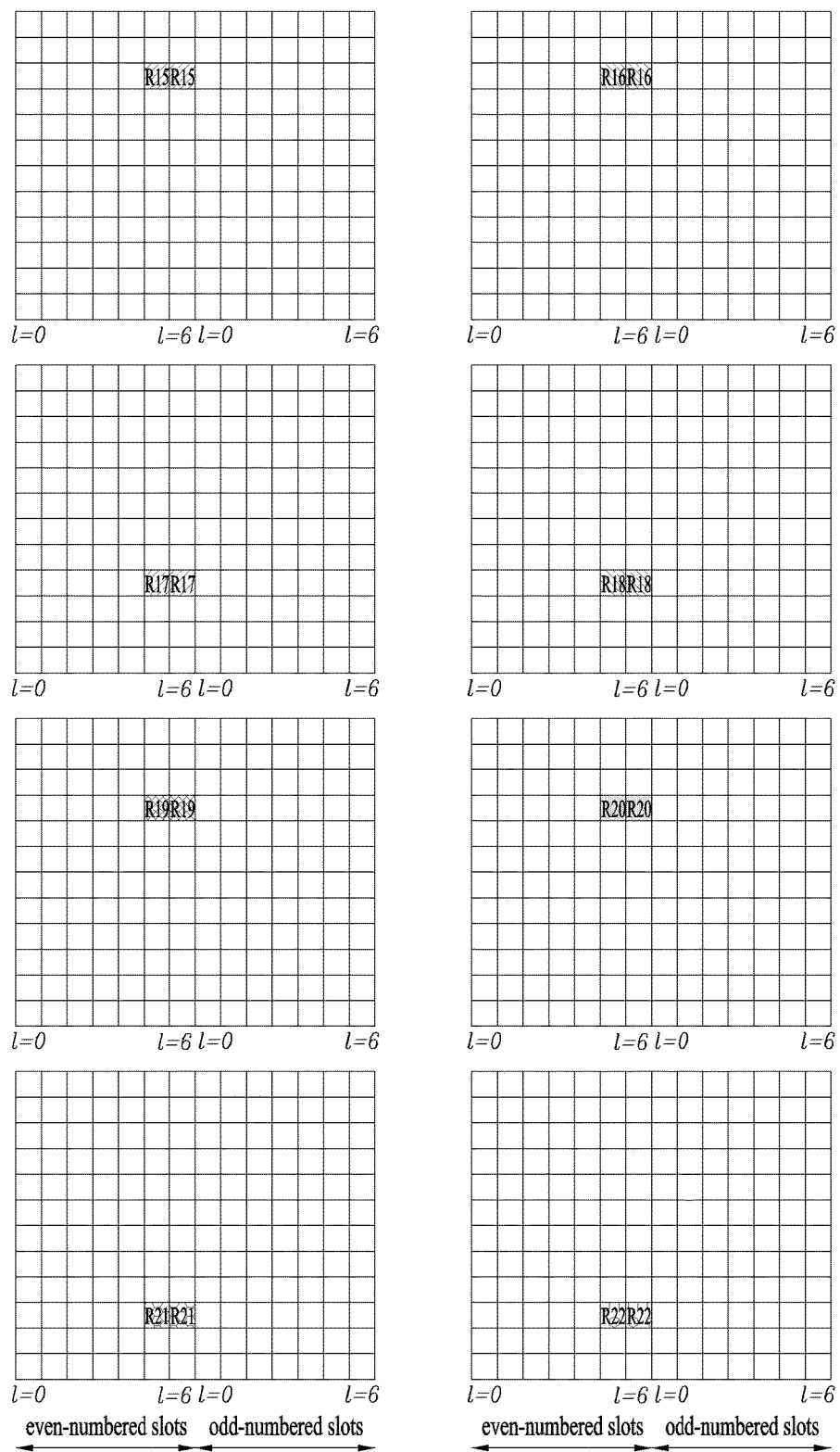
FIG. 11 exemplarily illustrates channel state information-reference signal (CSI-RS) configuration #0 in the case of a normal cyclic prefix (CP) among downlink CSI-RS configurations currently defined in the 3GPP specification.

In Tables 1 and 2, (k',l') denotes an RE index, k' denotes a subcarrier index, l' denotes an OFDM symbol index. FIG. 11 exemplarily illustrates CSI-RS configuration #0 in the case of a normal CP among CSI-RS configurations currently defined in the 3GPP specification.

CSI-RS subframe configurations can also be defined, and each CSI-RS subframe configuration includes a periodicity $T_{CSI-RS}$ and a subframe offset $\Delta_{CSI-RS}$ which are expressed on a subframe basis. Table 3 shows the CSI-RS subframe configurations defined in the 3GPP specification.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

The present invention proposes a method for efficiently feeding back channel state information (CSI) for uplink and downlink in a massive MIMO system having multiple I/O antennas and a multi-dimensional antenna structure.

Employment of an active antenna system (AAS) in a next-generation wireless communication system is under consideration. Unlike a legacy passive antenna separate from an amplifier capable of adjusting the phase and magnitude of a signal, an active antenna refers to an antenna including an active device such as an amplifier. The AAS does not require an additional cable, connector, other hardware, etc. for connecting the amplifier to the antenna, and has high efficiency in view of energy consumption and operating costs. Specifically, since electronic beam control per antenna is supported, the AAS allows advanced MIMO technology, e.g., precise beam pattern forming in consideration of beam direction and beam width or 3-dimensional (3D) beam pattern forming.

Due to employment of an advanced antenna system such as the above-described AAS, a massive MIMO structure having multiple I/O antennas and a multi-dimensional antenna structure is also under consideration. For example, unlike a legacy linear antenna array (or 1-dimensional (1D) antenna array), when a 2-dimensional (2D) antenna array is formed, a 3D beam pattern can be formed using active antennas of the AAS.

Figure 12:
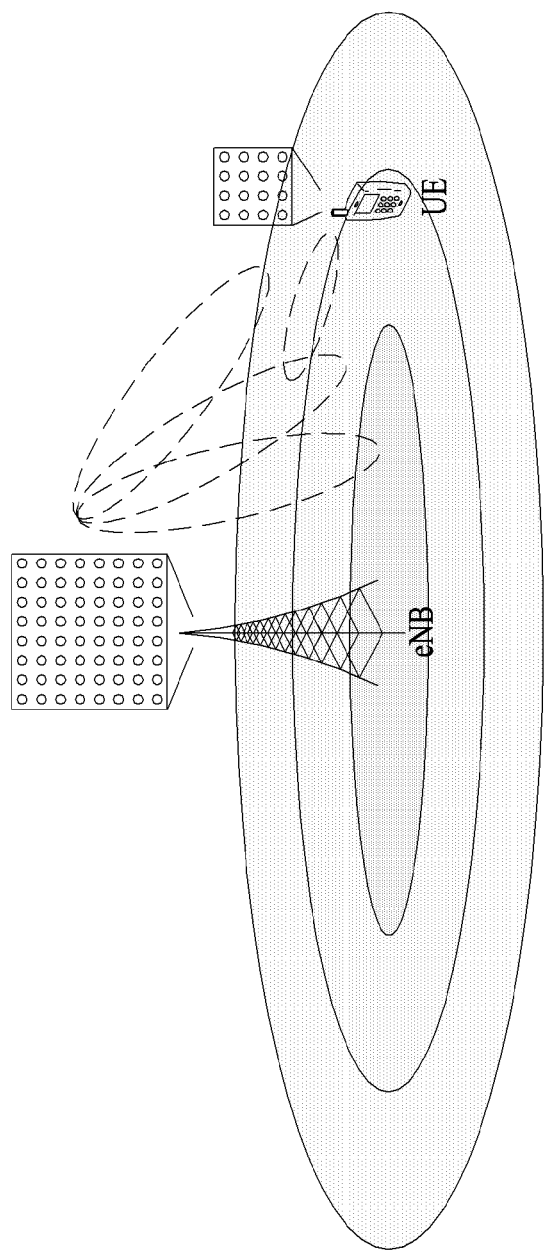
FIG. 12 is a diagram showing the concept of massive MIMO technology.

FIG. 12 is a diagram showing the concept of massive MIMO technology. Specifically, FIG. 12 illustrates a system in which an eNB or a UE has multiple Tx/Rx antennas capable of 3D beamforming base on an AAS system.

Referring to FIG. 12, when a 3D beam pattern is used in view of Tx antennas, quasi-static or dynamic beamforming can be performed not only in the horizontal beam direction but also in the vertical beam direction, and application such as vertical-direction sector forming can be considered. In view of Rx antennas, when Rx beams are formed using a massive Rx antenna, increase in signal power based on an antenna array gain may be expected.

Accordingly, in the case of uplink, the eNB may receive signals transmitted from the UE, through multiple antennas. In this case, the UE may configure Tx power thereof to a very low level in consideration of a gain of the massive Rx antenna to reduce the influence of interference.

A description is now given of antenna virtualization to apply massive MIMO technology.

Figure 13:
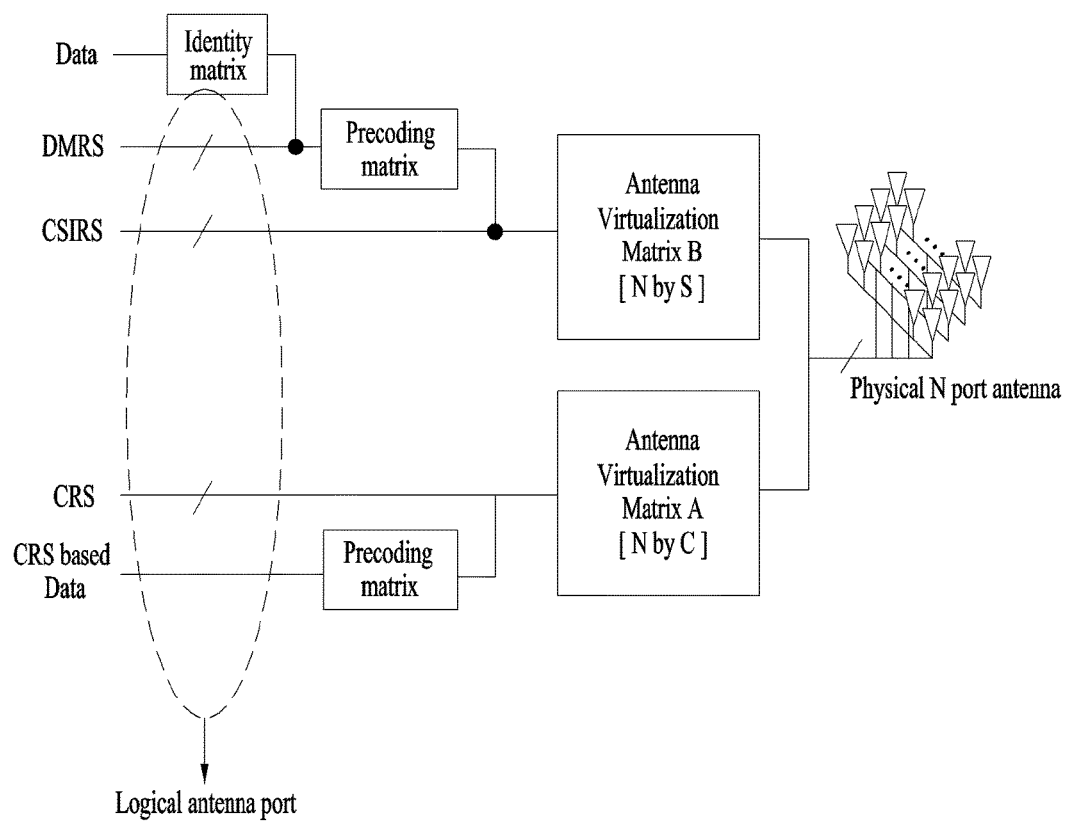
FIG. 13 is a diagram showing the concept of antenna virtualization.

FIG. 13 is a diagram showing the concept of antenna virtualization. Specifically, FIG. 13 illustrates a case in which CSI-RS uses S antenna ports and CRS uses C antenna ports. Furthermore, it is assumed that an antenna virtualization matrix B for the CSI-RS is defined UE-specifically, and an antenna virtualization matrix A for the CRS is defined equally to all UEs.

Referring to FIG. 13, when the CSI-RS is given as $x=[x_1\ x_2\ \ldots\ x_S]^T$, the signal after antenna virtualization can be expressed as $z=[z_1\ z_2\ \ldots\ z_N]^T = B \cdot x$. In addition, when the CRS is given as $y=[y_1\ y_2\ \ldots\ y_C]^T$, the signal after antenna virtualization can be expressed as $z=[z_1\ z_2\ \ldots\ z_N]^T = A \cdot y$.

Furthermore, different time delays can be applied to final antenna transmission signals as given by Equation 8 for application of frequency-selective antenna virtualization.

$$z=[z_1(t-\tau_1)z_2(t-\tau_2)\ldots z_N(t-\tau_N)]^T \quad \text{[Equation 8]}$$

Here, the antenna virtualization matrix B is preferably configured to achieve a maximum level of energy in the signals received by the corresponding UE, and should be determined per UE depending on, for example, the location of the UE. To define the antenna virtualization matrix B, a sounding reference signal (SRS) can be used based on channel reciprocity between uplink and downlink, and an optimal antenna virtualization matrix B based on variation in UE location, channel environment, etc. can be found using the SRS, preliminarily reported CSI feedback information, etc.

The present invention proposes a CSI feedback method for closed-loop 3D MIMO beamforming using a panel antenna to implement massive MIMO technology as in an AAS system.

Figure 14:
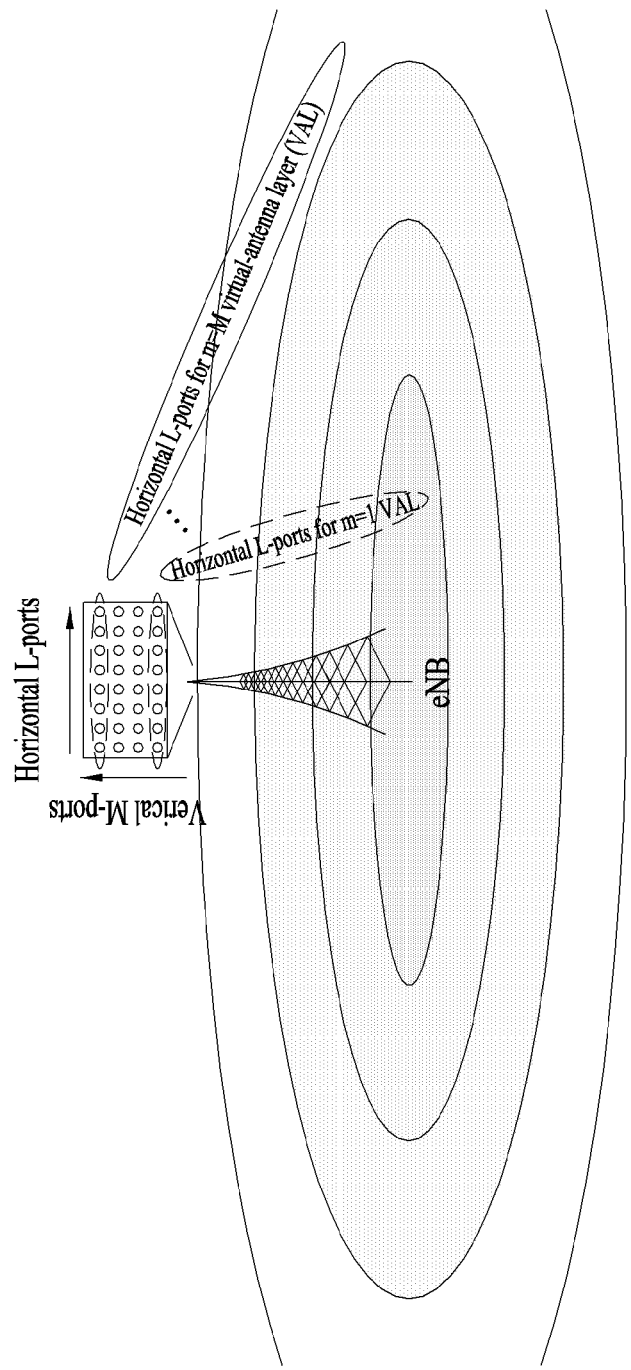
FIG. 14 is a diagram showing the concept of 3-dimensional (3D) MIMO beamforming according to the present invention.

FIG. 14 is a diagram showing the concept of 3D MIMO beamforming according to the present invention. Specifically, FIG. 14 assumes that an antenna of an eNB has L antenna ports in the horizontal direction (or H-direction) and has M antenna ports in the vertical direction (or V-direction). That is, this figure assumes an L*M panel antenna structure. Here, the L antenna ports and the M antenna ports can be physical antenna ports, or logical antenna ports expressed as an antenna virtualization matrix.

For convenience of explanation, FIG. 14 exemplarily illustrates a case in which L=8 and M=4. That is, this case corresponds to an 8*4 panel antenna structure, and signals transmitted from a total of 32 antenna ports form beams in the horizontal and vertical directions, thereby implementing 3D MIMO transmission.

Specifically, the above structure means that a specific antenna virtualization matrix is applied as described above in relation to FIG. 13 before the L antenna ports configured in the horizontal direction transmit signals from a total of N=L*M antenna ports which are present in each of physical-antenna-layers (PALs) 1, 2, . . . , M, and thus beams formed by the signals transmitted from the horizontal-direction L antenna ports can be gathered to any specific layer among virtual-antenna-layers (VALs) 1, 2, . . . , M.

Accordingly, the L antenna ports in VAL m=1 can be called L antenna ports targeting VAL 1, and the L antenna ports in VAL m=M can be called L antenna ports targeting VAL M. Furthermore, if the eNB defines L-port CSI-RS configurations, an L-port CSI-RS configuration targeting VAL 1 and an L-port CSI-RS configuration targeting VAL M can differ from each other.

Sum-Rank Based CSI Feedback

The present invention now proposes a CSI feedback method for supporting 3D beamforming using the above-described 2D antenna array structure. Specifically, the present invention proposes a method for efficiently feeding back CSI (e.g., RI, PMI, CQI) when RSs (e.g., CSI-RSs) are transmitted from N (=L*M) antenna ports of an eNB, and radio channels from the N antenna ports (hereinafter referred to as N-ports) of the eNB to a UE are measured using the RSs. In addition, the concept of a sum of ranks, i.e., sum-rank, serving as a basis to calculate and generate CSI as proposed by the present invention is also described here.

A variety of RS configurations can be considered to allow the UE to measure the N-port radio channels. For example, N-port CSI-RSs are designed, and may be configured and transmitted by the eNB, and thus the UE may measure radio channels for the N-ports. The N-port radio channels can be expressed as a matrix $H_{ALL}$ having a size of $N_{Rx}$-by-N, and $N_{Rx}$ denotes a total number of Rx antennas of the UE. Alternatively, the eNB may configure and transmit a total of M different L-port CSI-RSs as described in the above examples, and thus the UE may combine radio channels separately measured using the L-port CSI-RSs. Otherwise, the eNB may configure and transmit a specific L-port CSI-RS representing H-direction, and configure and transmit a specific M-port CSI-RS representing V-direction, and thus the UE may perform measurement based on these CSI-RSs and then perform, for example, 2D interpolation to estimate radio channels for a total of N-ports. As described above, channel measurement may be performed in various manners. The present invention proposes a method for efficiently feeding back CSI such as an N-by-$RI_{ALL}$ precoding matrix, total rank $RI_{ALL}$, and CQI by a UE when radio channels for the N-ports are measured as described in the above examples or using another method. Although the present invention proposes a method generally applicable to the case of $N_{Rx}>1$, the present invention is broadly applicable to the case of reception through a specific Rx antenna of the UE in the following description unless otherwise mentioned for convenience of explanation.

Embodiment 1

The present invention considers a precoding method for calculating an optimal precoding matrix (e.g., $W_H$) for a first dimension (e.g., H-direction) on the assumption of application of a specific precoding matrix (e.g., $W_V$) for a second dimension (e.g., V-direction) (or beams in the second dimension based on application of the specific precoding matrix), wherein a rank (e.g., $r_H$) of the first dimension is variable depending on the precoding matrix applied for the second dimension. Specifically, a rank (e.g., $r_H^{(i)}$) of an optimal precoding matrix (e.g., $W_H^{(i)}$) of the first dimension for an i-th VAL (or beam candidate) is variable depending on a precoding matrix (e.g., $W_V^{(i)}$) applied for the second dimension. A total rank $RI_{ALL}$ (e.g., $\upsilon$) in this case may be expressed as given by Equation 9.

$$\upsilon = \sum_i r_H^{(i)} \quad \text{[Equation 9]}$$

In Equation 9, the total rank is a sum of ranks of VALs of the first dimension, and thus may be called a sum-rank precoding method.

Here, the maximum number of VAL candidates (or hypotheses) of the second dimension is T (T≥1), and a specific VAL among the T VALs may be called an i-th VAL, where i=1, . . . , T (or i=0, . . . , T−1). In other words, it may be defined that the maximum number of beam candidates in the second dimension viewed by the UE is T. For example, on the assumption of L*M antenna ports, the maximum number of separate beams formable by V-direction M antenna ports may be T.

If the second dimension (e.g., V-direction) is restricted to rank-1 (rank-1-restricted), the UE may feedback and report an optimal second PMI (e.g., $W_V^{(i)}$ having a size of M-by-1) for an i-th VAL (or beam candidate) in the second dimension for $H_{ALL}$, a first RI (e.g., $r_H^{(i)}$) acquired when the second PMI is assumed, and a first PMI (e.g., $W_H^{(i)}$ having a size of L-by-$r_H^{(i)}$) based on the first RI, as a pair. Here, the VAL index i may have one value (e.g., i=0), or {second PMI, first RI, first PMI} values for all of a plurality of indexes i (e.g., i=0, 1, . . . , T−1) may be fed back and reported. At this time, T is the maximum number of VAL candidates (or hypotheses) in the second dimension. In addition, the PMIs for the index i may be summed to form a transmission signal as given by Equation 10.

$$z = \sum_i (W_V^{(i)} \otimes W_H^{(i)}) \cdot x^{(i)} \qquad \text{[Equation 10]}$$

In Equation 10, z is a signal or symbol to which precoding is applied, and $x^{(i)}$ is a transmission data symbol applied to the PMIs (e.g., the first PMI and the second PMI) per index i. For example, the transmission data symbol may be a DM-RS, or data to be transmitted through a PDSCH. That is, the same precoding scheme may be commonly applied to the DM-RS and the PDSCH to perform data demodulation. Meanwhile, in Equation 10, ⊗ denotes 2D interpolation (e.g., Kronecker product) of $W_V^{(i)}$ and $W_H^{(i)}$.

In this case, a CQI may be fed back and reported every i-th pair (e.g., {second PMI, first RI, first PMI}), or CQIs based on all PMIs and RIs for a total of T indexes may be calculated as an integrated CQI and the integrated CQI may be fed back and reported. A total rank $RI_{ALL}$ in this case is defined as given by Equation 9.

Specifically, in consideration of receiver beamforming assumptions (e.g., minimum mean square error (MMSE) receiver, MMSE-interference rejection combiner (IRC) receiver, etc.) of the UE, the UE may calculate a reception SINR value per layer (or per rank). Furthermore, if a plurality of codewords are supported, based on a codeword-to-layer mapping rule defining which layer signals are mapped to which codewords, a CQI index may be determined per codeword by calculating an average of SINR values for layer(s) mapped to a specific codeword.

Embodiment 2

While Embodiment 1 assumes that the second dimension (e.g., V-direction) is restricted to rank-1, the same principle is equally applicable to a case in which the first dimension (e.g., H-direction) is restricted to rank-1.

If the first dimension (e.g., H-direction) is restricted to rank-1, the UE may feedback and report an optimal first PMI (e.g., $W_H^{(i)}$ having a size of L-by-1) for an i-th VAL (or beam candidate) in the first dimension for $H_{ALL}$, a second RI (e.g., $r_v^{(i)}$) acquired when the first PMI is assumed, and a second PMI (e.g., $W_V^{(i)}$ having a size of M-by-$r_v^{(i)}$) based on the second RI, as a pair. Here, the VAL index i may have one value (e.g., i=0), or {first PMI, second RI, second PMI} values for all of a plurality of indexes i (e.g., i=0, 1, . . . , T−1) may be fed back and reported. At this time, T is the maximum number of VAL candidates (or hypotheses) in the first dimension. In addition, the PMIs for the index i may be summed to form a transmission signal as given by Equation 11.

$$z = \sum_i (W_H^{(i)} \otimes W_V^{(i)}) \cdot x^{(i)} \qquad \text{[Equation 11]}$$

In Equation 11, z is a signal or symbol to which precoding is applied, and $x^{(i)}$ is a transmission data symbol applied to the PMIs (e.g., the first PMI and the second PMI) per index i. For example, the transmission data symbol may be a DM-RS, or data to be transmitted through a PDSCH. That is, the same precoding scheme may be commonly applied to the DM-RS and the PDSCH to perform data demodulation. Meanwhile, in Equation 11, ⊗ denotes 2D interpolation (e.g., Kronecker product) of $W_H^{(i)}$ and $W_V^{(i)}$.

In this case, a CQI may be fed back and reported every i-th pair (e.g., {first PMI, second RI, second PMI}), or CQIs based on all PMIs and RIs for a total of T indexes may be calculated as an integrated CQI and the integrated CQI may be fed back and reported. Furthermore, if transmission of up to 2 codewords is supported, based on a codeword-to-layer mapping rule defining which layer signals are mapped to which codewords, a CQI may be calculated per codeword and the calculated CQI may be fed back and reported. A total rank $RI_{ALL}$ in this case is defined as given by Equation 12.

$$v = \sum_i r_V^{(i)} \qquad \text{[Equation 12]}$$

In addition, Equations 10 and 11 may have the same meaning depending on definition of the operator ⊗. That is, if it is predefined between the eNB and the UE about which one of the first PMI $W_H^{(i)}$ and the second PMI $W_V^{(i)}$ is first applied to ⊗ operation, any of Equations 10 and 11 may be used.

Embodiment 3

The current embodiment relates to a sum-rank precoding method used when the first dimension or the second dimension has no rank restriction (e.g., rank-1 restriction).

Specifically, the UE may feedback and report an optimal first RI (e.g., $r_H^{(i)}$) for an i-th VAL (or beam candidate) in the first dimension for $H_{ALL}$, a first PMI (e.g., $W_H^{(i)}$ having a size of L-by-$r_H^{(i)}$) based on the first RI, a second RI (e.g., $r_v^{(i)}$) acquired when the first PMI is assumed, and a second PMI (e.g., $W_V^{(i)}$ having a size of M-by-$r_v^{(i)}$) based on the second RI, as a pair. Here, the VAL index i may have one value (e.g., i=0), or {first RI, first PMI, second RI, second PMI} values for all of a plurality of indexes i (e.g., i=0, 1, . . . , T−1) may be fed back and reported. At this time, T is the maximum number of VAL candidates (or hypotheses) in the first dimension. In addition, the PMIs for the index i may be summed to form a transmission signal as given by Equation 10 or 11.

In this case, a CQI may be fed back and reported every i-th pair (e.g., {first RI, first PMI, second RI, second PMI}), or CQIs based on all PMIs and RIs for a total of T indexes may be calculated as an integrated CQI and the integrated CQI may be fed back and reported. Furthermore, if transmission of up to 2 codewords is supported, based on a codeword-to-layer mapping rule defining which layer signals are mapped to which codewords, a CQI may be calculated per codeword and the calculated CQI may be fed back and reported. A total rank $RI_{ALL}$ in this case is defined as given by Equation 13.

$$v = \sum_i r_V^{(i)} r_H^{(i)} \qquad \text{[Equation 13]}$$

In the current embodiment, the second RI (e.g., $r_v^{(i)}$) is variable, and thus feedback overhead may be reduced. That is, although feedback values are individually reported in the above embodiments in which rank-1 restriction in a specific dimension (or direction) is applied, feedback values corresponding to a plurality of indexes i may be grouped in the current embodiment and thus feedback overhead may be reduced. For example, if i=0, 1, 2, 3 is configured in Embodiment 1 or 2, i'=0, 1, 2 is configured in Embodiment 3, and i'=2 may correspond to i=2 and 3. Here, i' also corresponds to the index of a VAL in a specific dimension, and is defined as the index of a group of all or a part of i values.

In Embodiments 1 to 3, the UE may selectively perform feedback and report only for one index i (e.g., i=0). In this case, the UE may feedback one CSI set corresponding to the index i. The CSI set may include $\{r_H^{(i)}, r_V^{(i)}, W_H^{(i)}, W_V^{(i)},$ and CQI$\}$, where $r_H^{(0)}$ may be included if no rank restriction is applied for H-direction, and $r_V^{(0)}$ be included if no rank restriction is applied for V-direction.

Furthermore, in Embodiments 1 to 3, the UE may selectively perform feedback and report only for two or more indexes i (e.g., i=0, 1, . . . , T−1). In this case, the UE may feedback two or more CSI sets corresponding one-to-one to the indexes i. For example, when feedback and report are performed for T indexes i, T CSI sets may be fed back. Each of the T CSI sets may include $\{r_H^{(0)}, r_V^{(0)}, W_H^{(0)}, W_V^{(0)},$ and CQI$\}$, where $r_H^{(0)}$ may be included if no rank restriction is applied for H-direction, and $r_V^{(0)}$ may be included if no rank restriction is applied for V-direction. Alternatively, a CQI may not be fed back and reported per index i, and CQIs based on all PMIs and RIs for a total of T indexes i may be calculated as an integrated CQI and the integrated CQI may be fed back and reported.

As described above, the UE may select or determine index(es) i (or the last index i among sequential indexes i from i=0), for which CSI is to be fed back and reported, among the total of T indexes i. As such, feedback overhead may vary. For example, if it is assumed that rank-1 restriction of $r_V^{(i)}=1$ is given, $r_H^{(0)}=4$ corresponds to i=0, and $r_H^{(1)}=2$ corresponds to i=1, a final sum-rank may be determined as 6. That is, when an optimal precoding matrix (e.g., $W_H^{(i)}$) for the first dimension (e.g., H-direction) is calculated on the assumption of application of a specific precoding matrix (e.g., $W_V^{(i)}$) for a second dimension (e.g., V-direction) (or beams in the second dimension based on application of the specific precoding matrix), it is considered that a rank (e.g., $r_H^{(i)}$) in the first dimension is variable depending on the specific precoding matrix (e.g., $W_V^{(i)}$) assumed in the second dimension. Accordingly, the CSI feedback method proposed by the present invention includes a variety of modifications considering that a rank value (e.g., $r_H^{(i)}$) serving as a basis of the optimal precoding matrix (e.g., $W_H^{(i)}$) per VAL is variable or independent (that is, rank values may be equal or different, or a restriction for configuring the same rank value is not applied).

Embodiment 4

According to the present invention, the UE may report a selector bit indicating the number of indexes i for which CSI feedback is reported, to the eNB. The selector bit may be indicated by reporting the value T in the above embodiments. This value T information or the selector bit may be included in CSI feedback.

In the case of aperiodic CSI report (e.g., CSI report through PUSCH), the number of CSI sets to be fed back is determined depending on the reported value T. That is, total feedback overhead is determined depending on the value T.

Furthermore, specific DCI may include a field (e.g., CSI request field) for triggering aperiodic CSI report, and it is assumed that this field has a bit width of D (for example, in the case of DCI format 2D, a CSI request field having a size of 2 bits may be included, and the present invention is not limited to a specific DCI format and is applicable to arbitrary DCI including a CSI request field having a field size of D). In this case, the present invention proposes a method for configuring a value applicable as the value T (or, value T restriction information), using at least one state value among $2^D$ states that the CSI request field can have. That is, the eNB may restrict values selectable as the value T by the UE, and the UE may select the value T within the restricted values to determine/calculate CSI.

The value T restriction information may be given using one or more of, for example, a maximum value $T_{max}$, a minimum value $T_{min}$, a range (i.e., maximum and minimum values), and a candidate set (e.g., $\{1, 2, 4\}$) of the value T.

Specifically, aperiodic CSI report may be triggered using at least one of the $2^D$ state values of the CSI request field other than a specific state value indicating that CSI report is not requested. Table 4 shows an example of the CSI request field having a size of 2 bits.

TABLE 4

| Value of CSI request field | Description |
| --- | --- |
| '00' | No aperiodic CSI report is triggered |
| '01' | Aperiodic CSI report is triggered for a set of CSI process(es) configured by higher layers for serving cell c |
| '10' | Aperiodic CSI report is triggered for a $1^{st}$ set of CSI process(es) configured by higher layers |
| '11' | Aperiodic CSI report is triggered for a $2^{nd}$ set of CSI process(es) configured by higher layers |

For example, when the value of a CSI request field in an uplink DCI format of a PDCCH/Enhanced-PDCCH (EPDCCH) detected in a UE-specific search space is 01, aperiodic CSI report for a set of CSI-process(es) configured by higher layers (e.g., RRC) for a serving cell c may be triggered. Here, value T restriction information may be included in the description part of Table 4 and may be correspondingly applied if the state value of the CSI request field is 01 (the value T restriction information may also be correspondingly applied when the value of the CSI request field is 10 or 11). Alternatively, although Table 4 does not directly include the value T restriction information, value T restriction information to be applied to CSI report for a specific serving cell (and/or a specific CSI-process or a specific sub-CSI-process) may be preliminarily provided through higher layer signaling and then may be correspondingly applied when CSI report for the specific serving cell/specific CSI-process/specific sub-CSI-process is triggered based on the state value of the CSI request field. As described above, the value T restriction information to be applied when the UE determines/calculates CSI may be dynamically indicated using the CSI request field.

Embodiment 5

Due to restriction on transmission capacity, periodic CSI report (e.g., CSI report through PUCCH) may be configured as a feedback report chain for transmitting various CSI values over a plurality of reporting instances depending on the type (e.g., RI, PMI, CQI), property (e.g., wideband (WB)), or subband (SB) of CSI transmitted from the UE to the eNB.

In this case, the value T information (or selector bit) may be included in information transmitted at a specific instance of the feedback report chain.

For example, the value T information may be transmitted at an instance for transmitting CSI to be fed back and reported in a long-term period. For example, the value T information may be joint-encoded and transmitted together with RI at an instance for transmitting the RI. Otherwise, when PMI is specified as a pair of a first PMI (e.g., denoted by W1 or i1) and a second PMI (e.g., denoted by W2 or i2), the value T information may be joint-encoded and transmitted together with the first PMI.

Alternatively, the value T information may be transmitted at an instance for transmitting CSI to be fed back and reported in a short-term period. For example, the value T information may be joint-encoded and transmitted together with the second PMI.

In addition, according to the present invention, if the value T is included and transmitted at a specific reporting instance of the feedback report chain, the feedback report configuration (e.g., feedback report type, feedback report period, etc.) may vary depending on the value T at subsequent reporting instances.

For example, if T=1 is reported at a specific reporting instance, this may serve as a restriction for feeding back and reporting only CSI for i=0 until the value T is subsequently reported (or until a specific subsequent reporting instance).

For example, if T≥2 is reported at a specific reporting instance, CSI for i=0, 1, . . . , T−1 is fed back and reported until the value T is subsequently reported (or until a specific subsequent reporting instance).

Here, the feedback chain may be configured in the order of index i (e.g., ascending order or descending order), and in the order of feedback report type (e.g., in the order of RI, PMI, and CQI) among CSI values for the same index i. For example, all CSI values for i=1 may be reported after all CSI values for i=0 are reported.

Alternatively, the feedback chain may be configured in the order of equal or similar feedback report types, and in the order of index i among CSI values corresponding to the equal/similar feedback report types. For example, RIs may be initially reported. Specifically, RI for i=0, RI for i=1, . . . , and RI for i=T−1 may be sequentially reported. Then, PMIs may be reported. Specifically, PMI for i=0, PMI for i=1, . . . , and PMI for i=T−1 may be sequentially reported.

Embodiment 6

In 3GPP LTE Release-11, CSI-processes are defined. Each CSI-process may be configured for the UE using a CSI-process configuration information element (IE). The CSI-process configuration IE may include CSI-RS identity information, CSI-interference measurement (IM) resource identity information, and CSI-process identity information. The CSI-RS identity information may be configured using a CSI-RS configuration IE, and the CSI-IM identity information may be configured using a CSI-IM configuration IE. A CSI-process configuration may refer to the CSI-RS identity information and the CSI-IM identity information. Alternatively, the CSI-process configuration may further include the CSI-process identity information, and define the relation among the CSI-RS identity information, the CSI-IM identity information, and a CSI-process.

According to the present invention, a specific CSI-process index may be given per index i, and aperiodic or periodic feedback may be performed per CSI-process index. The mapping relationship between the index i and the CSI-process index may be predefined between the eNB and the UE, or may be configured by the eNB through UE-specific higher layer signaling (e.g., RRC signaling).

Here, the CSI-process index may be an index given for a pair of the CSI-RS identity information, the CSI-IM identity information and the CSI-process identity information, or given as a sub-CSI-process index. Specifically, when up to 4 CSI-process indexes (e.g., 0, 1, 2, 3) are configured according to the LTE Release-11 standards, these CSI-processes may be interpreted to individually correspond to 4 different coordinated multi-point (CoMP) feedback configurations. However, in the present invention, the sub-CSI-process index may be used to specify a subdivided feedback configuration per antenna port group within one CoMP feedback configuration (e.g., configuration for CSI feedback on downlink transmission from one transmission point (TP)). For example, when one TP has an L*M antenna structure, the configuration for CSI feedback on downlink transmission from the TP may be subdivided into multiple sub-CSI-processes, and each sub-CSI-process index may be mapped to the index i.

Although a description of a specific CSI-process configured per index i is given below for brevity, the above description may be replaced by a description of a sub-CSI-process configured per index i.

Additionally, the present invention defines and proposes feedback of RI=0 when a specific CSI-process is configured per index i. Although the minimum value of RI is RI=1 in the legacy LTE system, the present invention newly defines feedback of RI=0. If RI is defined to always have a value equal to or greater than 1, the UE should consider a case in which rank-1 transmission (i.e., 1-layer transmission) is always performed per index i. For example, in the case of T=2, the UE may determine that an appropriate number of layers capable of achieving the maximum throughput and causing no interference in downlink transmission from the eNB is rank 2 (e.g., $r_H^{(0)}=2$ or $r_V^{(0)}=2$) for i=0, and rank 0 (e.g., $r_H^{(0)}=0$ or $r_V^{(0)}=0$) for i=1 (that is, 2-layer transmission for i=0 and no transmission for i=1 may be determined as optimal transmission). Nevertheless, if the minimum value of RI is restricted to 1, the UE should report rank 2 transmission for i=0 and rank 1 transmission for i=1 instead of optimal rank values, and such CSI feedback may not accurately reflect an actual channel state, reducing the efficiency of using network resources.

Accordingly, the present invention proposes to configure the range of rank values to 0 to $r_{max}$. In view of the UE, the meaning of RI=0 for a specific index i may be understood as that the eNB prefers no data transmission for the specific index i.

In addition, the meaning of configuration of this 0-rank indicator per CSI-process is also applicable to other methods by which the UE feeds back and reports the value T information (or selector bit). For example, when a total of T indexes i (i=0, 1, . . . , T−1) are configured, RI=0 for a specific index i (e.g., i=1) may be interpreted that T−1 indexes i (e.g., i=0, 2, . . . , T−1) are actually configured. As such, although the UE does not report the value T information, the eNB may determine the number of indexes i other than RI=0, as a value T preferred by the UE.

Furthermore, in the case of RI=0 for a specific index i, PMI for the index i may not be fed back (or omitted or dropped), or a null state value may be fed back.

For example, in the case of periodic CSI feedback and RI=0 for a specific index i, the feedback report configuration (e.g., feedback report type, feedback report period, etc.) at subsequent reporting instances may be configured differently from that of the case of RI≥1. For example, CSI (e.g., PMI and/or CQI) for the specific index i may be omitted (or dropped) or fed back with a null state value after RI=0 for the specific index i is reported and until a subsequent RI reporting instance (or a specific reporting instance).

Embodiment 7

The present invention proposes a compression method capable of reducing feedback overhead in periodic CSI feedback report.

For example, PMIs of a specific dimension (e.g., $W_V^{(i)}$ values of the second dimension (or V-direction)) are initially fed back and reported. If these PMIs (e.g., $W_V^{(0)}$, $W_V^{(1)}$, ..., $W_V^{(T-1)}$) include PMIs having the same value at adjacent indexes i, only one of the PMIs having the same value may be valid and the other PMI(s) may be omitted/dropped or fed back with a null state value. For example, when $W_V^{(0)}$, $W_V^{(1)}$, ..., $W_V^{(T-1)}$ are aligned in the order of low (or high) index i, if $W_V^{(0)}$ and $W_V^{(1)}$ have different values but $W_V^{(1)}$, $W_V^{(2)}$ and $W_V^{(3)}$ have the same value, only one $W_V^{(i)}$ value (e.g., $W_V^{(1)}$ or $W_V^{(3)}$) corresponding to the lowest (or highest) index i may be fed back validly, and the other $W_V^{(i)}$ values (e.g., $W_V^{(2)}$ and $W_V^{(3)}$, or $W_V^{(1)}$ and $W_V^{(2)}$) may be omitted/dropped or fed back with a null state value. The same rule is re-applicable (i.e., recursively applicable) to the other $W_V^{(i)}$ values (e.g., $W_V^{(4)}$, ..., $W_V^{(T-1)}$) and thus, if PMIs corresponding to adjacent indexes i have the same value, only one thereof may be fed back as a valid value and the others may be omitted/dropped or fed back with a null state value.

For example, in periodic CSI feedback report, if $W_V^{(i)}$ values for all indexes i when the maximum rank in the second dimension (or V-direction) is restricted to 1 (e.g., $r_{max,V}=1$) are initially fed back and reported, and if $W_V^{(0)}$, $W_V^{(1)}$, ..., $W_V^{(T-1)}$ have the same value, only feedback (e.g., $W_V^{(0)}$) corresponding to i=0 may be valid and feedback (e.g., $W_V^{(1)}$, $W_V^{(2)}$, ..., $W_V^{(T-1)}$) corresponding to i=1, 2, ..., T−1 may be omitted/dropped or fed back with a null state value.

Similarly, in periodic CSI feedback report, if $W_H^{(i)}$ values for all indexes i when the maximum rank in the first dimension (or H-direction) is restricted to 1 (e.g., $r_{max,H}=1$) are initially fed back and reported, and if $W_H^{(0)}$, $W_H^{(1)}$, ..., $W_H^{(T-1)}$ have the same value, only feedback (e.g., $W_H^{(0)}$) corresponding to i=0 may be valid and feedback (e.g., $W_H^{(1)}$, $W_H^{(2)}$, ..., $W_H^{(T-1)}$) corresponding to i=1, 2, ..., T−1 may be omitted/dropped or fed back with a null state value.

When this method is applied, feedback of $W_V^{(i)}$ or $W_H^{(i)}$ may be understood as functioning as the value T information (or selector bit).

As described above, by applying the above compression method for all indexes i, only one of $W_V^{(i)}$ values having the lowest (or highest) index i may be fed back and reported.

In addition, feedback and report of the $W_V^{(0)}$, $W_V^{(1)}$, ..., $W_V^{(T-1)}$ values for all indexes i may not separately use specific bit widths, but may be joint-encoded to use a predetermined specific bit width. Specifically, a set of $\{W_V^{(0)}, W_V^{(1)}, ..., W_V^{(T-1)}\}$ individually mapped to state values expressible using a specific bit width may be predetermined, and a specific state value may be fed back and reported to indicate the set of $\{W_V^{(0)}, W_V^{(1)}, ..., W_V^{(T-1)}\}$.

For example, if T=3, rank-1 restriction is provided to all $W_V^{(i)}$ values, and a total of 3 PMI indexes (e.g., 0, 1, 2) are given to rank-1, a joint encoding rule applied to $W_V^{(0)}$, $W_V^{(1)}$, and $W_V^{(2)}$ may be given as shown in Table 5.

TABLE 5

| State | $W_V^{(0)}$ | $W_V^{(1)}$ | $W_V^{(2)}$ |
|---|---|---|---|
| 00000 | 0 | 0 | 0 |
| 00001 | 0 | 0 | 1 |
| 00010 | 0 | 0 | 2 |
| 00011 | 0 | 1 | 0 |
| 00100 | 0 | 1 | 1 |
| 00101 | 0 | 1 | 2 |
| 00110 | 0 | 2 | 0 |
| 00111 | 0 | 2 | 1 |
| 01000 | 0 | 2 | 2 |
| 01001 | 1 | 0 | 0 |
| 01010 | 1 | 0 | 1 |
| 01011 | 1 | 0 | 2 |
| 01100 | 1 | 1 | 0 |
| 01101 | 1 | 1 | 1 |
| 01110 | 1 | 1 | 2 |
| 01111 | 1 | 2 | 0 |
| 10000 | 1 | 2 | 1 |
| 10001 | 1 | 2 | 2 |
| 10010 | 2 | 0 | 0 |
| 10011 | 2 | 0 | 1 |
| 10100 | 2 | 0 | 2 |
| 10101 | 2 | 1 | 0 |
| 10110 | 2 | 1 | 1 |
| 10111 | 2 | 1 | 2 |
| 11000 | 2 | 2 | 0 |
| 11001 | 2 | 2 | 1 |
| 11010 | 2 | 2 | 2 |
| ... | reserved | reserved | reserved |

One $W_V^{(i)}$ a value may be defined using a size of 2 bits to indicate one of 0, 1, and 2. If $W_V^{(0)}$, $W_V^{(1)}$, and $W_V^{(2)}$ are separately fed back and reported, a total of 6 bits are necessary. However, if the joint encoding rule of Table 5 is applied, 5 bits are necessary and thus feedback overhead may be reduced.

Additionally, for example, if T=2, rank-1 restriction is provided to all $W_V^{(i)}$ values, and a total of 3 PMI indexes (e.g., 0, 1, 2) are given to rank-1, a joint encoding rule applied to $W_V^{(0)}$ and $W_V^{(1)}$ may be given as shown in Table 6.

TABLE 6

| State | $W_V^{(0)}$ | $W_V^{(1)}$ |
|---|---|---|
| 0000 | 0 | NULL |
| 0001 | 0 | 1 |
| 0010 | 0 | 2 |
| 0011 | 1 | 0 |
| 0100 | 1 | NULL |
| 0101 | 1 | 2 |
| 0110 | 2 | 0 |
| 0111 | 2 | 1 |
| 1000 | 2 | NULL |
| ... | reserved | reserved |

The example of Table 6 shows a method for defining each state not to indicate the same value between $W_V^{(0)}$ and $W_V^{(1)}$, and reporting only one (e.g., $W_V^{(0)}$) thereof as a valid value while defining the other (e.g., $W_V^{(1)}$) with a null value. That is, in the state value 0000 of the example of Table 6, $W_V^{(1)}$ is defined with a null value and is interpreted as having the same value (e.g., 0) as $W_V^{(0)}$. Similarly, the value of $W_V^{(1)}$ defined with a null value in the state value 0100 of the example of Table 6 is interpreted as 1, and the value of $W_V^{(1)}$ defined with a null value in the state value 1000 of the example of Table 6 is interpreted as 2.

Furthermore, the principle of the feedback overhead reduction method (for example, parameters having the same value are omitted/dropped or configured with a null value, and/or joint-encoded) described in the current embodiment is applicable as a feedback overhead reduction method in feedback of other parameters (e.g., re if no rank restriction is applied, $r_V^{(i)}$ if no rank restriction is applied, $W_H^{(i)}$, $W_V^{(1)}$, $CQI^{(i)}$, etc.).

Embodiment 8

The current embodiment proposes a method for reflecting inter-layer interference in calculating reception quality (e.g., reception SINR) of each transmission data layer when the UE determines RI and PMI capable of achieving the maximum throughput in a measured downlink channel, and determines CQI based thereon.

For example, if T=2, layers for i=1 should be calculated as interference when a reception SINR of layers for i=0 is calculated. To this end, the magnitude of a signal added to a CSI-IM resource in the case of i=0 may be adjusted to reflect the influence of interference caused by a signal in the case of i=1. However, it is not easy to accurately reflect the direction and magnitude of the interference. Specifically, since interference of a transmission signal at i=1 to a transmission signal at i=0 is determined depending on PMI in the case of i=1, a legacy feedback method may not easily preliminarily predict the PMI in the case of i=1, which is to be fed back, and transmit an interference measurement signal in a CSI-IM resource in the case of i=0 by reflecting a signal to which the PMI predicted as described above is applied. Accordingly, the present invention proposes to configure one common CSI-IM resource for all indexes i instead of configuring separate CSI-IM resources for the indexes i even when a non-zero-power (NZP) CSI-RS resource (e.g., L-port CSI-RS of H-direction, or M-port CSI-RS of V-direction) for CSI measurement is configured per index i.

If separate CSI-processes are configured for the indexes i, each CSI-process may include one CSI-RS resource separately configured per index i (or per CSI-process), and one CSI-IM resource commonly configured for the indexes i.

Furthermore, when the CSI-process configured per index i is referred to as a sub-CSI-process, a separate NZP CSI-RS resource may be configured per sub-CSI-process, and one CSI-IM resource for a specific CSI-process including all sub-CSI-processes (i.e., one CSI-IM resource commonly given to the sub-CSI-processes) may be configured.

Embodiment 9

According to the current embodiment, a rank value (e.g., $r_H^{(0)}$ or $r_V^{(0)}$) for a specific index i (e.g., a default index or i=0) may be restricted to be equal to or greater than $r_{min}$ in at least one of a first dimension and a second dimension. Here, $r_{min}=1$ may be configured.

For example, if $r_{min}=1$, a rank value at each index i may be 0 (see Embodiment 6). However, by restricting the rank value of the specific index i to be equal to or greater than 1, a total rank value $RI_{ALL}$ may be equal to or greater than at least 1 in any case. As described above, a restriction for configuring the total rank value $RI_{ALL}$ to be equal to or greater than at least 1 may be provided. Furthermore, a subdivided rank restriction for configuring a specific minimum value (e.g., $r_{min,H}^{(i)}$ or $r_{min,V}^{(i)}$) per $r_H^{(i)}$ or $r_V^{(i)}$ may be applied.

Besides, depending on the number of antennas of the UE, the capability of a wireless transmitter/receiver, etc., a case in which up to only $r_{max}$ data layers are receivable may be considered. In this case, the sum of RIs, i.e., $RI_{ALL}$, to be fed back may be restricted to the maximum possible value, i.e., $r_{max}$. Furthermore, a subdivided rank restriction for configuring a specific minimum value (e.g., $r_{max,H}^{(i)}$ or $r_{max,V}^{(i)}$) per $r_H^{(i)}$ or $r_V^{(i)}$ may be applied.

In addition, a set of candidate values that each parameter can have for $RI_{ALL}$, $r_H^{(i)}$, or $r_V^{(i)}$ may be configured and signaled to the UE through higher layer signaling (e.g., RRC signaling). In this case, the UE may select and report RI among the selectable candidate values configured as described above.

One or more of the above-described various types of RI restriction information (e.g., $r_{max}$, $r_{max,H}^{(i)}$, $r_{max,V}^{(i)}$, $r_{min}$, $r_{min,H}^{(i)}$, $r_{min,V}^{(i)}$, and the set of candidate values for $RI_{ALL}$, $r_H^{(i)}$, or $r_V^{(i)}$ may be signaled by higher layers as information corresponding to the state value of the CSI request field shown in Table 4. Alternatively, the various types of RI restriction information may be configured per CSI-process or per sub-CSI-process by higher layers. In this case, the UE should select and report RI among the selectable candidate values configured by higher layers.

In the above-described embodiments of the present invention, descriptions based on the first dimension (or H-direction) and the second dimension (or V-direction) are merely exemplary, and may be switched to descriptions based on the second dimension (or V-direction) and the first dimension (or H-direction) without departing from the scope of the present invention. For example, $r_V^{(i)}$ may be replaced by $r_H^{(i)}$ and $W_V^{(i)}$ may be replaced by $W_H^{(i)}$ to describe the principles of the above-described embodiments. That is, the exemplary CSI feedback methods proposed by the present invention are not limited to a specific dimension (e.g., first dimension or second dimension) or a specific direction (e.g., V-direction or H-direction).

Furthermore, although the embodiments of the present invention have been described above on the assumption of two spatial dimensions such as H direction and V direction, the scope of the present invention is not limited to the number of dimensions. That is, the principle proposed by the present invention is equally applicable to three or more dimensions.

The above-described proposal of the present invention is focused on CSI measurement based on CSI-RS, but is equally or similarly extendable to another reference signal (e.g., CRS, SRS, tracking RS (TRS), or DMRS) subject to CSI measurement for the above L*M panel antenna capable of 3D beamforming, or another type of cell-specific or UE-specific reference signal.

Figure 15:
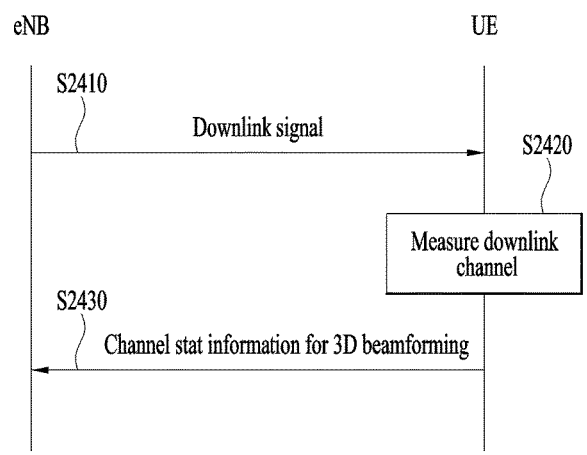
FIG. 15 is a diagram for describing a method for transmitting and receiving channel state information (CSI) according to an embodiment of the present invention.

FIG. 15 is a diagram for describing a method for transmitting and receiving channel state information (CSI) according to an embodiment of the present invention.

In step S10, an eNB may transmit a downlink signal (e.g., a downlink reference signal) used to measure a downlink channel, to a UE, and the UE may receive the same.

In step S20, the UE may measure the downlink channel using the downlink signal. The UE may determine and/or calculate CSI for 3D beamforming, based on the measured downlink channel. This CSI may be determined/calculated based on various methods proposed by the present invention (e.g., CSI determination methods considering that a rank value in a second dimension for T VALs (or beam candidates) of a first dimension is independent/variable, i.e., sum-rank based CSI determination methods).

In step S30, the UE may report a CSI set (e.g., one or more of $r_H^{(i)}$, $r_V^{(i)}$, $W_H^{(i)}$, $W_V^{(i)}$, and CQI) for each (i.e., i-th VAL (or beam candidate)) of the CSI values (e.g., T VALs (or beam candidates) for 3D beamforming, to the eNB. CSI report may be performed in a periodic or aperiodic manner.

Although the exemplary method of FIG. 15 is described as a series of steps for brevity of explanation, the above description does not limit the order of those steps and some or all of the steps may be performed simultaneously or in different orders as necessary. In addition, not all steps of FIG. 15 are inevitably necessary to implement the method proposed by the present invention.

In the above-described method of the present invention, the descriptions given in the above embodiments of the present invention may be applied independently or in combination.

Figure 16:
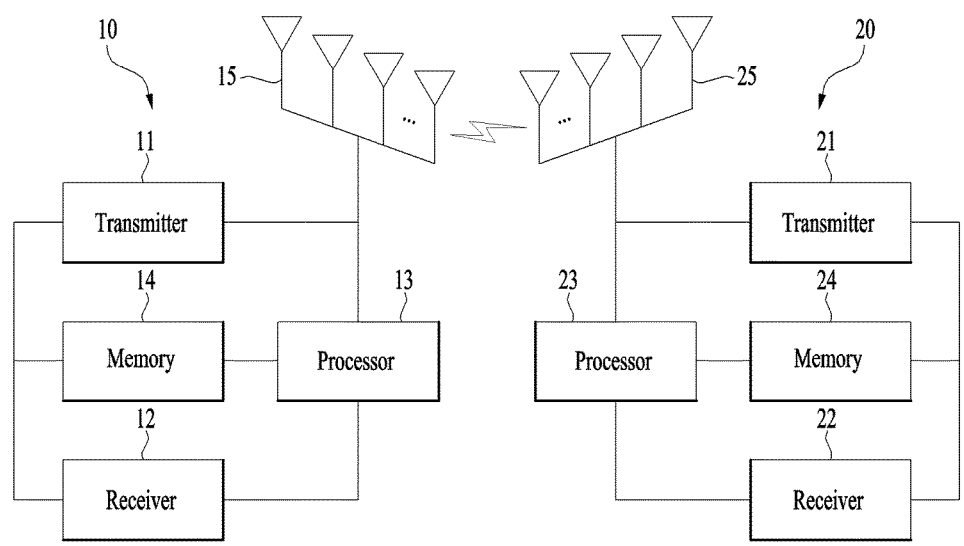
FIG. 16 is a block diagram of a user equipment (UE) and a base station according to an embodiment of the present invention.

FIG. 16 is a block diagram of a UE 20 and a base station 10 according to an embodiment of the present invention.

Referring to FIG. 16, the base station 10 according to the present invention may include a transmitter 11, a receiver 12, a processor 13, a memory 14 and multiple antennas 15. The transmitter 11 may transmit a variety of signals, data and information to an external device (e.g., UE). The receiver 12 may receive a variety of signals, data and information from an external device (e.g., UE). The processor 13 may provide overall control to the base station 10. The multiple antennas 15 may be configured based on, for example, a 2D antenna array.

The processor 13 of the base station 10 according to an embodiment of the present invention may be configured to receive CSI based on the proposals of the present invention. Furthermore, the processor 13 of the base station 10 may process information received and to be transmitted by the base station 10, and the memory 14 may store the processed information for a predetermined time and is replaceable by another component such as a buffer (not shown).

Referring to FIG. 16, the UE 20 according to the present invention may include a transmitter 21, a receiver 22, a processor 23, a memory 24 and multiple antennas 25. The multiple antennas 25 refer to a device supporting MIMO transmission/reception. The transmitter 21 may transmit a variety of signals, data and information to an external device (e.g., base station). The receiver 22 may receive a variety of signals, data and information from an external device (e.g., base station). The processor 23 may provide overall control to the UE 20.

The processor 23 of the UE 20 according to an embodiment of the present invention may be configured to transmit CSI based on the proposals of the present invention. Furthermore, the processor 23 of the UE 20 may process information received and to be transmitted by the UE 20, and the memory 24 may store the processed information for a predetermined time and is replaceable by another component such as a buffer (not shown).

The above configuration of the UE 20 may be implemented in such a manner that the above-described embodiments of the present invention are applied independently or two or more embodiments are simultaneously applied thereto, and repeated descriptions thereof are not given here for clarity.

A base station is exemplified as a downlink transmission entity or an uplink reception entity and a UE is exemplified as a downlink reception entity or an uplink transmission entity to describe the embodiments of the present invention, but the scope of the present invention is not limited thereto.

For example, the description of the base station may be equally applied to a case in which a cell, an antenna port, an antenna port group, an RRH, a transmission point, a reception point, an access point or a relay serves as an entity of downlink transmission to the UE or an entity of uplink reception from the UE. In addition, the principle of the present invention described through various embodiments may be equally applied to a case in which a relay serves as an entity of downlink transmission to the UE or an entity of uplink reception from the UE or a case in which a relay serves as an entity of uplink transmission to the base station or an entity of downlink reception from the base station.

The above-described embodiments of the present invention may be implemented by various means, for example, hardware, firmware, software, or a combination thereof.

In a hardware configuration, the methods according to embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to embodiments of the present invention may be implemented in the form of modules, procedures, functions, etc. for performing the above-described functions or operations. Software code may be stored in a memory unit and executed by a processor. The memory unit may be located inside or outside the processor and exchange data with the processor via various known means.

The detailed descriptions of the preferred embodiments of the present invention have been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

Although a method for reporting channel state information (CSI) for 3-dimensional (3D) beamforming in a wireless communication system, and an apparatus therefor according to the present invention is applied to a 3GPP LTE system in the above description, the method and apparatus are also applicable to a variety of wireless communication systems other than the 3GPP LTE system.

The invention claimed is:

1. A method for transmitting channel state information (CSI) by a user equipment (UE) in a wireless communication system, the method comprising:
receiving a reference signal from a base station supporting a 2-dimensional (2D) antenna array;
determining the CSI using the reference signal; and
transmitting the determined CSI to the base station,
wherein the CSI comprises a CSI set for each of T (T≥2) beam candidates defined in a first dimension of the 2D antenna array,
wherein the CSI set comprises a rank indicator (RI) in the first dimension, a precoding matrix index (PMI) in the first dimension, a RI in a second dimension of the 2D antenna array, a PMI in the second dimension, and a channel quality indicator (CQI), wherein the RI in the second dimension is variable in each of the T beam candidates, and wherein the RI in the second dimension and the PMI in the second dimension are determined based on the RI in the first dimension and the PMI in the first dimension is applied to each of the T beam candidates, wherein, when a value of specific-type CSI for an i-th beam candidate among the T beam candidates equals a value of the specific-type CSI for an (i+1)-th beam candidate, the value of the specific-type CSI for the i-th beam candidate is validly reported and the value of the specific-type CSI for the (i+1)-th beam candidate is dropped or configured with a null value, and wherein i is an integer value equal to or greater than 0 and less than T.

2. The method according to claim 1, wherein the CQI is calculated individually for the i-th beam candidate among the T beam candidates.

3. The method according to claim 1, wherein the CQI is calculated as an integrated CQI for the T beam candidates.

4. The method according to claim 1, wherein, when a rank value in the first dimension is restricted to 1, the RI in the first dimension in the CSI set is omitted.

5. The method according to claim 1, wherein the CSI set includes information about a value T selected by the UE.

6. The method according to claim 5, wherein the value T is restricted by restriction information configured by the base station, and wherein the restriction information includes one or more of maximum value, a minimum value, and a candidate value of the value T.

7. The method according to claim 1, wherein, in case of periodic CSI report, the CSI set for one beam candidate among the T beam candidates is reported and then the CSI set for one subsequent beam candidate is reported.

8. The method according to claim 1, wherein one CSI-process is configured for each of the T beam candidates, and wherein the CSI-process is configured using a CSI-reference signal (RS) resource configured for each of the T beam candidates, and a CSI-interference measurement (IM) resource commonly configured for the T beam candidates.

9. The method according to claim 1, wherein the RI in the first dimension or the RI in the second dimension has a minimum value of 0.

10. The method according to claim 1, wherein T pieces of equal-type CSI for the T beam candidates are joint-encoded.

11. The method according to claim 1, wherein one or more of the RI in the first dimension and the RI in the second dimension for a specific beam candidate among the T beam candidates are configured to be equal to or greater than 1.

12. The method according to claim 1, wherein the first dimension corresponds to a horizontal direction of the 2D antenna array and the second dimension corresponds to a vertical direction of the 2D antenna array, or wherein the first dimension corresponds to the vertical direction of the 2D antenna array and the second dimension corresponds to the horizontal direction of the 2D antenna array.

13. A user equipment (UE) for transmitting channel state information (CSI) in a wireless communication system, the UE comprising:

a transmission module;

a reception module; and a processor, wherein the processor receives a reference signal from a base station supporting a 2-dimensional (2D) antenna array, using the reception module, determines the CSI using the reference signal, and transmits the determined CSI to the base station using the transmission module, wherein the CSI comprises a CSI set for each of T (T≥2) beam candidates defined in a first dimension of the 2D antenna array, wherein the CSI set comprises a rank indicator (RI) in the first dimension, a precoding matrix index (PMI) in the first dimension, a RI in a second dimension of the 2D antenna array, a PMI in the second dimension, and a channel quality indicator (CQI), wherein the RI in the second dimension is variable in each of the T beam candidates, and wherein the RI in the second dimension and the PMI in the second dimension are determined based on the RI in the first dimension and the PMI in the first dimension is applied to each of the T beam candidates, wherein, when a value of specific-type CSI for an i-th beam candidate among the T beam candidates equals a value of the specific-type CSI for an (i+1)-th beam candidate, the value of the specific-type CSI for the i-th beam candidate is validly reported and the value of the specific-type CSI for the (i+1)-th beam candidate is dropped or configured with a null value, and wherein i is an integer value equal to or greater than 0 and less than.

* * * * *